United States Patent
Nakagawa et al.

(10) Patent No.: US 7,304,108 B2
(45) Date of Patent: Dec. 4, 2007

(54) POLYMER, PROCESS FOR PRODUCING THE POLYMER, AND CURABLE COMPOSITION CONTAINING THE POLYMER

(75) Inventors: Yoshiki Nakagawa, Kobe (JP); Kenichi Kitano, Kobe (JP); Masayuki Fujita, Kobe (JP); Nao Fujita, Kobe (JP)

(73) Assignee: Kaneka Corporation, Osaka (JP)

( * ) Notice: Subject to any disclaimer, the term of this patent is extended or adjusted under 35 U.S.C. 154(b) by 223 days.

(21) Appl. No.: 11/089,506

(22) Filed: Mar. 25, 2005

(65) Prior Publication Data

US 2007/0004880 A1     Jan. 4, 2007

Related U.S. Application Data

(62) Division of application No. 10/260,416, filed on Oct. 1, 2002, now Pat. No. 6,887,936, which is a division of application No. 09/509,095, filed as application No. PCT/JP98/04250 on Sep. 22, 1998, now Pat. No. 6,482,900.

(30) Foreign Application Priority Data

Sep. 22, 1997 (JP) .................................. 9-256606
May 25, 1998 (JP) .................................. 10-143235

(51) Int. Cl.
    *C08F 4/06* (2006.01)
(52) U.S. Cl. .................. 525/100; 526/318; 526/319
(58) Field of Classification Search ............. 525/100; 526/318, 319
    See application file for complete search history.

(56) References Cited

U.S. PATENT DOCUMENTS

| | | |
|---|---|---|
| 5,763,548 A | 6/1998 | Matyjaszewski et al. |
| 5,789,487 A | 8/1998 | Matyjaszewski et al. |
| 5,807,937 A | 9/1998 | Matyjaszewski et al. |
| 5,852,129 A | 12/1998 | Kusakabe et al. |
| 5,986,014 A | 11/1999 | Kusakabe et al. |
| 6,274,688 B1 | 8/2001 | Nakagawa et al. |
| 6,407,187 B1 | 6/2002 | Matyjaszewski et al. |

FOREIGN PATENT DOCUMENTS

| | | |
|---|---|---|
| EP | 0789036 A2 | 8/1997 |
| JP | 5247119 | 9/1993 |
| JP | 5255415 | 10/1993 |
| JP | 5262608 | 10/1993 |
| JP | 7002928 | 1/1995 |
| WO | WO-96/30421 | 10/1996 |
| WO | WO-97/18247 | 5/1997 |
| WO | WO-98/40416 | 9/1998 |

*Primary Examiner*—Bernard Lipman
(74) *Attorney, Agent, or Firm*—Connolly Bove Lodge & Hutz LLP

(57) ABSTRACT

A vinyl polymer having, at a molecular chain terminus, a structure represented by the general formula 1:

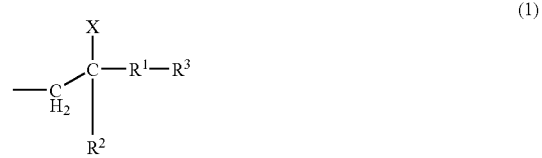

(1)

(wherein $R^3$ is a hydroxy, amino, epoxy, carboxylic acid, ester, ether, amide or silyl group, an alkenyl group having low polymerizability, an organic compound having 1 to 20 carbon atoms, X is a halogen atom, a nitroxide or sulfide group or a cobalt porphyrin complex).

10 Claims, No Drawings

POLYMER, PROCESS FOR PRODUCING THE POLYMER, AND CURABLE COMPOSITION CONTAINING THE POLYMER

This application is a Divisional of U.S. Ser. No. 10/260,416 filed Oct. 1, 2002, now U.S. Pat. No. 6,887,936 which is a Divisional of U.S. Ser. No. 09/509,095 filed Jun. 5, 2000, now U.S. Pat. No. 6,482,900, which is a National Phase of PCT/JP98/04520 filed Sep. 22, 1998.

TECHNICAL FIELD

The present invention relates to a vinyl polymer having a terminal functional group, a process of producing the same and a curable composition comprising said polymer.

BACKGROUND ART

Polymers having a terminal functional group are known to give cured products excellent in heat resistance and durability, among others, upon crosslinking either by themselves or in combination with an appropriate curing agent. Typical examples among them are alkenyl-, hydroxy- or crosslinkable silyl-terminated polymers. Alkenyl-terminated polymers are crosslinked and cure upon use, as a curing agent, of a hydrosilyl-containing compound or upon application of a photochemical reaction. Hydroxy-terminated polymers, when reacted with a polyisocyanate, form a urethane bond and cure. Crosslinkable silyl-terminated polymers, when they absorb moisture in the presence of an appropriate condensation catalyst, give cured products.

As examples of the main chain skeleton of such alkenyl-, hydroxy- or crosslinkable silyl-terminated polymers, there may be mentioned, among others, polyether polymers such as polyethylene oxide, polypropylene oxide and polytetramethylene oxide; hydrocarbon polymers such as polybutadiene, polyisoprene, polychloroprene, polyisobutylene, and hydrogenation products derived from these; and polyester polymers such as polyethylene terephthalate, polybutylene terephthalate and polycaprolactone. Such polymers are used in various applications depending on the main chain skeleton and the mode of crosslinking.

Apart from those polymers illustrated above which are obtainable by ionic polymerization or polycondensation, those vinyl polymers having a terminal functional group which are obtainable by radical polymerization have scarcely been put to practical use. Among vinyl polymers, (meth)acrylic polymers have high weathering resistance and transparency, among others, which cannot be expected of the above-mentioned polyether polymers, hydrocarbon polymers or polyester polymers, and those having alkenyl or crosslinkable silyl groups on side chains are used in high weathering resistance paint compositions and the like. On the other hand, the polymerization control of vinyl polymers is not easy owing to side reactions and it is very difficult to introduce a functional group terminally thereinto.

If vinyl polymers having a functional group at a molecular chain terminus can be obtained in a simple and easy manner, there will be obtained cured products excellent in physical properties as compared with those having an alkenyl group on side chains. For that reason, investigations have been so far made by a large number of researchers to develop a process for producing them. However, it is still not easy to produce them on a commercial scale.

In Japanese Kokai Hei-05-255415 is disclosed a process of synthesizing (meth)acrylic polymers having an alkenyl group at both termini by using an alkenyl-containing disulfide as a chain transfer agent and, in Japanese Kokai Hei-05-262808, there is disclosed a process of synthesizing (meth)acrylic polymers having an alkenyl group at both termini which comprises synthesizing a (meth)acrylic polymer having a hydroxy group at both termini using a hydroxy-containing disulfide and then introducing an alkenyl group at both termini by utilizing the reactivity of the hydroxy group. However, it is not easy to introduce an alkenyl group into both termini with certainty by these processes. For terminally introducing a functional group with certainty, the chain transfer agent must be used in a large amount, which raises a problem from the production process viewpoint.

Separately, the present inventors have already invented a process of introducing an olefin group terminally into a vinyl polymer by adding, after polymerization of a vinyl polymer, a compound having a polymerizable alkenyl group and an alkenyl group low in polymerizability to thereby reacting the polymerizable alkenyl group with the polymer terminus. By this process, however, it is not easy to introduce only one olefin into a terminus with certainty even when the polymerization proceeds in a living mode. In particular, addition of the olefin at a stage at which the polymerizable monomer still remains results in random copolymerization, which makes it more difficult to control the structure.

Accordingly, the present invention has an object to have a vinyl polymer having a terminal functional group, a process for producing the same and a curable composition comprising said polymer.

It is known that, generally, unactivated olefins, such as α-olefins, is not polymerized in the manner of radical polymerization. The same also applies to living radical polymerization, which has recently been investigated actively.

As a result of intensive investigations, the present inventors found that when an inactivated (low polymerizability) olefin is added to a living radical polymerization system, approximately one molecule alone adds to the growing terminus and, by utilizing this finding, invented a process for producing polymers having various terminal functional groups.

SUMMARY OF THE INVENTION

A first aspect of the present invention is concerned with a vinyl polymer having, at a molecular chain terminus, a structure represented by the general formula 1:

(1)

wherein $R^3$ is a hydroxy, amino, epoxy, carboxylic acid, ester, ether, amide or silyl group, a group represented by the general formula 2:

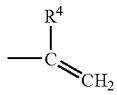 (2)

in which $R^4$ is a hydrogen atom or a methyl group, or a polymerizable olefin-free organic group containing 1 to 20 carbon atoms, $R^1$ is a divalent hydrocarbon group containing 1 to 20 carbon atoms or a group having a structure represented by the general formula 3:

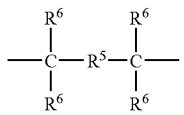 (3)

in which $R^5$ is an oxygen atom, a nitrogen atom or an organic group containing 1 to 20 carbon atoms, $R^6$ is a hydrogen atom or a methyl group and each may be the same or different, and $R^2$ is a hydrogen atom or a methyl group and X is a halogen, nitroxide or sulfide group or a cobalt porphyrin complex.

The vinyl polymer having a terminal functional group according to the present invention can be produced by adding a functional group-containing olefin compound having low polymerizability to a living radical polymerization system during polymerization or after completion of the polymerization.

The functional group-containing olefin compound having low polymerizability is represented by the general formula 4:

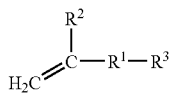 (4)

wherein $R^3$ is a hydroxy, amino, epoxy, carboxylic acid, ester, ether, amide or silyl group, a group represented by the general formula 2:

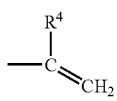 (2)

in which $R^4$ is a hydrogen atom or a methyl group, or a polymerizable olefin-free organic group containing 1 to 20 carbon atoms, $R^1$ is a divalent hydrocarbon group containing 1 to 20 carbon atoms or a group having a structure represented by the general formula 3:

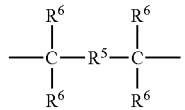 (3)

in which $R^5$ is an oxygen atom, a nitrogen atom or an organic group containing 1 to 20 carbon atoms, $R^6$ is a hydrogen atom or a methyl group and each may be the same or different, and $R^2$ is a hydrogen atom or a methyl group.

The vinyl polymer having a terminal functional group according to the present invention has a feature that a molecular weight distribution is narrow.

The vinyl polymer having a terminal functional group according to the present invention can be used by adding a curing agent thereto according to need, for preparing a curable composition comprising said vinyl monomer.

DETAILED DESCRIPTION OF THE INVENTION

Vinyl Polymer Having a Functional Group at Termini

The vinyl polymer having a terminal structure represented by the general formula 1 comprises approximately one terminal group in question bound to each polymer terminus directly via a carbon-carbon bond, without the intermediary of a hetero atom:

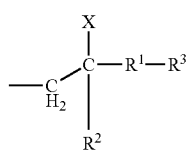 (1)

wherein $R^3$ is a hydroxy, amino, epoxy, carboxylic acid, ester, ether, amide or silyl group, a group represented by the general formula 2:

 (2)

(in which $R^4$ is a hydrogen atom or a methyl group) or a polymerizable olefin-free organic group containing 1 to 20 carbon atoms, $R^1$ is a divalent hydrocarbon group containing 1 to 20 carbon atoms or a group having a structure represented by the general formula 3:

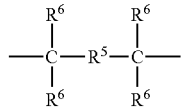 (3)

(in which $R^5$ is an oxygen atom, a nitrogen atom or an organic group containing 1 to 20 carbon atoms, $R^6$ is a hydrogen atom or a methyl group and each may be the same or different), $R^2$ is a hydrogen atom or a methyl group and X is a halogen, nitroxide or sulfide group or a cobalt porphyrin complex.

As specific examples of $R^1$ in the general formula 1, there may be mentioned the following:

—$(CH_2)_n$— (n being an integer of 1 to 20),

—$CH(CH_3)$—, —$CH(CH_2CH_3)$—, —$C(CH_3)_2$—, —$C(CH_3)(CH_2CH_3)$—, —$C(CH_2CH_3)_2$—, —$CH_2CH(CH_3)$—, —$(CH_2)_n$—O—$CH_2$— (n being an integer of 1 to 19), —$CH(CH_3)$—O—$CH_2$—, —$CH(CH_2CH_3)$—O—$CH_2$—, —$C(CH_3)_2$—O—$CH_2$—, —$C(CH_3)(CH_2CH_3)$—O—$CH_2$—, —$C(CH_2CH_3)_2$—O—$CH_2$—, —$(CH_2)_n$—O—$(CH_2)_m$— (m and n each being an integer of 1 to 19, with the condition $2 \leq m+n \leq 20$), —$(CH_2)_n$—C(O)O—$(CH_2)_m$— (m and n each being an integer of 1 to 19, with the condition $2 \leq m+n \leq 20$), —$(CH_2)_n$—OC(O)—$(CH_2)_m$—C(O)O—$(CH_2)_l$— (l being an integer of 0 to 18 and m and n each being an integer of 1 to 17, with the condition $2 \leq l+m+n \leq 18$), —$(CH_2)_n$-o-,m-,p-$C_6H_4$—, —$(CH_2)_n$—o-,m-,p-$C_6H_4$—$(CH_2)_m$— (m being an integer of 0 to 13 and n being an integer of 1 to 14, with the condition $1 \leq m+n \leq 14$), —$(CH_2)_n$-o-,m-,p-$C_6H_4$—O—$(CH_2)_m$— (m being an integer of 0 to 13 and n being an integer of 1 to 14, with the condition $1 \leq m+n \leq 14$), —$(CH_2)_n$-o-,m-,p-$C_6H_4$—O—$CH(CH_3)$— (n being an integer of 1 to 12), —$(CH_2)_n$-o-,m-,p-$C_6H_4$—O—$CH(CH_3)_2$— (n being an integer of 1 to 11), —$(CH_2)_n$—o—,m-,p-$C_6H_4$—C(O)O—$(CH_2)_m$— (m and n each being an integer of 1 to 12, with the condition $2 \leq m+n \leq 13$), —$(CH_2)_n$—OC(O)-o-,m-p-$C_6H_4$—C(O)O—$(CH_2)_m$— (m and n each being an integer of 1 to 11, with the condition $2 \leq m+n \leq 12$), —$(CH_2)_n$-o-,m-,p-$C_6H_4$—OC(O)—$(CH_2)_m$— (m and n each being an integer of 1 to 12, with the condition $2 \leq m+n \leq 13$), —$(CH_2)_n$—C(O)O-o-,m-,p-$C_6H_4$—$(CH_2)_m$— (m and n each being an integer of 1 to 11, with the condition $2 \leq m+n \leq 12$), and the like.

In the general formula 1, $R^2$ is a hydrogen atom or a methyl group, preferably a hydrogen atom. X is a halogen, nitroxide or sulfide group or a cobalt porphyrin complex. From the ease of production viewpoint, X is preferably a halogen group, in particular bromo.

As examples of $R^3$ in the general formula 1, there may be mentioned the following:

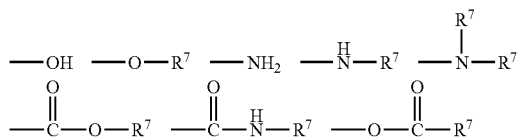

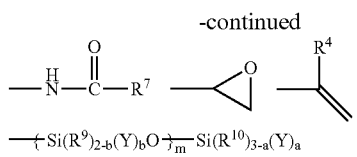

wherein $R^7$ is a hydrocarbon group containing 1 to 20 carbon atoms, $R^9$ and $R^{10}$ each is an alkyl group containing 1 to 20 carbon atoms, an aryl group containing 6 to 20 carbon atoms, an aralkyl group containing 7 to 20 carbon atoms or a triorganosiloxy group represented by $(R')_3SiO$— (in which R' is a monovalent hydrocarbon group containing 1 to 20 carbon atoms and the three R' groups may be the same or different) and; when two or more $R^9$ or $R^{10}$ groups are present, they may be the same or different, Y represents a hydroxy group or a hydrolyzable group and, when two or more Y groups are present, they may be the same or different; a represents 0, 1, 2 or 3, b represents 0, 1 or 2 and m is an integer of 0 to 19, with the condition $a+mb \geq 1$.

As specific examples of $R^7$, there may be mentioned the following:

—$(CH_2)_n$—$CH_3$,
—$CH(CH_3)$— $(CH_2)_n$—$CH_3$,
—$CH(CH_2CH_3)$— $(CH_2)_n$—$CH_3$,
—$CH(CH_2CH_3)_2$,
—$C(CH_3)_2$—$(CH_2)_n$—$CH_3$,
—$C(CH_3)(CH_2CH_3)$— $(CH_2)_n$—$CH_3$,
—$C_6H_5$,
—$C_6H_5(CH_3)$,
—$C_6H_5(CH_3)_2$,
—$(CH_2)_n$—$C_6H_5$—,
—$(CH_2)_n$—$C_6H_5(CH_3)$,
—$(CH_2)_n$—$C_6H_5(CH_3)_2$ wherein n is an integer not smaller than 0 and the total number of carbon atoms is not more than 20.

The hydrolyzable group represented by Y is not particularly restricted but may be any of those known in the art. Specifically, there may be mentioned a hydrogen, halogen atom, and alkoxy, acyloxy, ketoximate, amino, amide, acid amide, aminoxy, mercapto, alkenyloxy and like groups. From the viewpoint of mild hydrolyzability and easy handling, alkoxy groups are particularly preferred. One to three such hydrolyzable and/or hydroxy groups can be bound to one silicon atom and the total number of hydrolyzable groups, namely a+mb, is preferably within the range of 1 to 5. When two or more hydrolyzable and/or hydroxy groups are present in this silyl group, they may be the same or different. The number of silicon atoms constituting this silicon group may be one, two or more and, in the case of silicon atoms connected by siloxane bonding, the number of silicon atoms may amount up to about 20.

The structure of $R^3$ is not limited to those illustrated above but may be any of various structures. Preferred, however, are hydroxy, amino, epoxy, carboxylic acid, ester, ether, amide and silyl groups. Alkenyl groups represented by the general formula 2 are also preferred. Among them, alkenyl and hydroxy groups are particularly preferred. As regards the alkenyl groups, they are limited to those having no radical polymerizability in view of the production process. There are no other particular limitations. The term "silyl group" as used in the present invention means a silicon atom-containing group, and as preferred examples thereof, there can be mentioned crosslinkable silyl groups and silyl groups generally used as protective groups, among others.

In cases where there is an alkenyl group introduced terminally, no particular limitations are imposed on the structure of the general formula 1, although the following structure may be mentioned as a preferred example:

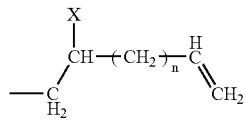

n is an integer of 1 to 20, preferably 2, 4 or 6, because of ready raw material availability.

The number of terminal groups to be contained in each molecule of the vinyl polymer of the present invention is not particularly restricted but, in cases where said polymer is used in curable compositions, it is preferred that two or more be contained.

The radical polymerizable olefin monomer constituting the main chain of said vinyl polymer is not particularly restricted but includes various species. As examples, there may be mentioned (meth)acrylic acid, methyl(meth)acrylate, ethyl(meth)acrylate, n-propyl(meth)acrylate, isopropyl(meth)acrylate, n-butyl(meth)acrylate, isobutyl(meth)acrylate, tert-butyl(meth)acrylate, n-pentyl(meth)acrylate, n-hexyl(meth)acrylate, cyclohexyl(meth)acrylate, n-heptyl(meth)acrylate, n-octyl(meth)acrylate, 2-ethylhexyl(meth)acrylate, nonyl(meth)acrylate, decyl(meth)acrylate, dodecyl(meth)acrylate, phenyl(meth)acrylate, toluyl(meth)acrylate, benzyl(meth)acrylate, 2-methoxyethyl(meth)acrylate, 3-methoxybutyl(meth)acrylate, 2-hydroxyethyl(meth)acrylate, 2-hydroxypropyl(meth)acrylate, stearyl(meth)acrylate, glycidyl(meth)acrylate, 2-aminoethyl(meth)acrylate, γ-(methacryloyloxy)propyltrimethoxysilane, (meth)acrylic acid-ethylene oxide adducts, trifluoromethylmethyl(meth)acrylate, 2-trifluoromethylethyl(meth)acrylate, 2-perfluoroethylethyl(meth)acrylate, 2-perfluoroethyl-2-perfluorobutylethyl(meth)acrylate, 2-perfluoroethyl(meth)acrylate, perfluoromethyl(meth)acrylate, diperfluoromethylmethyl(meth)acrylate, 2-perfluoromethyl-2-perfluoroethylmethyl(meth)acrylate, 2-perfluorohexylethyl(meth)acrylate, 2-perfluorodecylethyl(meth)acrylate, 2-perfluorohexadecylethyl(meth)acrylate and like (meth)acrylic monomers; styrene, vinyltoluene, α-methylstyrene, chlorostyrene, styrenesulfonic acid and salts thereof, and like styrenic monomers; perfluoroethylene, perfluoropropylene, vinylidene fluoride and like fluorine-containing vinyl monomers; vinyltrimethoxysilane, vinyltriethoxysilane and like silicon-containing vinyl monomers; maleic anhydride, maleic acid, maleic acid monoalkyl esters and dialkyl esters; fumaric acid, fumaric acid monoalkyl esters and dialkyl esters; maleimide, methylmaleimide, ethylmaleimide, propylmaleimide, butylmaleimide, hexylmaleimide, octylmaleimide, dodecylmaleimide, stearylmaleimide, phenylmaleimide, cyclohexylmaleimide and like maleimide monomers; acrylonitrile, methacrylonitrile and like nitrile group-containing vinyl monomers; acrylamide, methacrylamide and like amide group-containing vinyl monomers; vinyl acetate, vinyl propionate, vinyl pivalate, vinyl benzoate, vinyl cinnamate and like vinyl esters; ethylene, propylene and like alkenes; butadiene, isoprene and like conjugated dienes; vinyl chloride, vinylidene chloride, allyl chloride and allyl alcohol, among others. These may be used singly or a plurality of monomers may be copolymerized. Among them, styrenic monomers and (meth)acrylic monomers are preferred from the viewpoint of physical properties of products, among others. Further, from the viewpoint of high reactivity in functional group introduction reaction in the practice of the present invention and of low glass transition temperature, among others, acrylic ester monomers are more preferred and butyl acrylate is particularly preferred.

The vinyl polymer of the present invention preferably has a molecular weight distribution, namely ratio (Mw/Mn) of weight average molecular weight (Mw) to number average molecular weight (Mn) as determined by gel permeation chromatography, of less than 1.8, more preferably not more than 1.6, most preferably not more than 1.3.

The vinyl polymer of the present invention preferably has a number average molecular weight within the range of 500 to 100,000, more preferably 3,000 to 40,000. When the molecular weight is not more than 500, the characteristics intrinsic in the vinyl polymer can hardly be expressed. A molecular weight not less than 100,000 makes handling difficult.

Method of Producing the Vinyl Polymer Having a Functional Group at Termini

The production process of the present invention comprises adding a functional group-containing olefin compound having low polymerizability to a living radical polymerization system during polymerization or after completion of the polymerization to thereby produce a vinyl polymer having a terminal functional group.

The "living radical polymerization" proceeds at a high rate of polymerization and hardly undergoes termination reactions and gives a polymer with a narrow molecular weight distribution (an Mw/Mn value of about 1.1 to 1.5) in spite of it being a radical polymerization which is regarded as difficult to control because of tendency toward occurrence of termination reactions such as radical-to-radical coupling. It is also possible, in living radical polymerization, to arbitrarily control the molecular weight by adjusting the monomer/initiator charge ratio.

The "living radical polymerization" method thus can give a polymer having low viscosity and a narrow molecular weight distribution and, in addition, allows introduction of the specific functional group-containing monomer into the polymer mostly at the desired sites and, therefore, is preferred as the production process the above specific functional group-containing vinyl polymer.

While the term "living polymerization", in its narrower sense, means polymerization in which molecular chains grow while the termini thereof always retain their activity, said term generally includes, within the meaning thereof, quasi-living polymerization in which terminally inactivated molecules and terminally active molecules grow in a state of equilibrium. The latter definition applies to the living polymerization to be employed in the practice of the present invention.

Such "living radical polymerization" has recently been studied actively by various groups of researchers. As examples, there may be mentioned, among others, the polymerization which uses a cobalt-porphyrin complex as described in J. Am. Chem. Soc., 1994, vol. 116, pages 7943 ff, the polymerization which uses a radical capping agent such as a nitroxide compound as described in Macromolecules, 1994, vol. 27, pages 7228 ff., and "atom transfer radical polymerization (ATRP)" which uses an organic halide or the like as the initiator and a transition metal complex as the catalyst.

Among the "living radical polymerization" techniques, the above-mentioned "atom transfer radical polymerization" technique, which uses an organic halide or halogenated sulfonyl compound or the like as the initiator and a transition metal complex as the catalyst for polymerizing vinyl monomers, has, in addition to the above-mentioned features of "living radical polymerization", features in that it gives a polymer having a halogen or the like, which is relatively advantageous to functional group conversion, at main chain termini and that the degree of freedom in initiator and catalyst designing and, therefore, is more preferred as the production process in the practice of the present invention. This atom transfer radical polymerization is described, for example, by Matyjaszewski et al. in J. Am. Chem. Soc., 1995, vol. 117, pages 5614 ff.; Macromolecules, 1995, vol. 28, pages 7901 ff.; Science, 1996, vol. 272, pages 866 ff.; WO 96/30421 and WO 97/18247, and by Sawamoto et al. in Macromolecules, 1995, vol. 28, pages 1721 ff.

In the production process of the present invention, the use of the atom transfer radical polymerization technique is preferred although there are no particular restrictions as to which of the techniques mentioned above is to be employed.

Among such living radical polymerization techniques, the technique which uses a radical capping agent such as a nitroxide compound is first described. In this polymerization technique, a stable nitroxy free radical (=N—O.) is generally used as a radical capping agent. Such compound is not restricted but is preferably a 2,2,6,6-substituted-1-piperidinyloxy radical, a 2,2,5,5-substituted-1-pyrrolidinyloxy radical or nitroxy free radical derived from a cyclic hydroxyamine. Suitable as the substituents are alkyl groups containing not more than 4 carbon atoms, such as methyl or ethyl. As specific nitroxy free radical compounds, they are not restricted but include, among others, 2,2,6,6-tetramethyl-1-piperidinyloxy radical (TEMPO), 2,2,6,6-tetraethyl-1-piperidinyloxy radical, 2,2,6,6-tetramethyl-4-oxo-1-piperidinyloxy radical, 2,2,5,5-tetramethyl-1-pyrrolidinyloxy radical, 1,1,3,3-tetramethyl-2-isoindolinyloxy radical and N,N-di-t-butylamine-oxy radical. Such a stable free radical as galvinoxyl free radical may be used in lieu of the nitroxy free radical.

Said radical capping agent is used in combination with a radical generator. It is supposed that the reaction product from the radical capping agent and radical generator serve as a polymerization initiator to thereby cause the polymerization of an addition-polymerizable monomer(s) to proceed. The ratio between the amounts of both is not particularly restricted but the radical initiator is judiciously used in an amount of 0.1 to 10 moles per mole of the radical capping agent.

While various compounds can be used as the radical generator, a peroxide capable of generating a radical under polymerization temperature conditions is preferred. Said peroxide is not restricted but includes, among others, diacyl peroxides such as benzoyl peroxide and lauroyl peroxide; dialkyl peroxides such as dicumyl peroxides and di-t-butyl peroxide; peroxycarbonates such as diisopropyl peroxydicarbonate and bis(4-t-butylcyclohexyl)peroxydicarboante; and alkyl peresters such as tert-butyl peroxyoctoate and t-butyl peroxybenzoate. In particular, benzoyl peroxide is preferred. Further, such a radical generator as a radical generating azo compound, for example azobisisobutyronitrile, may also be used in lieu of the peroxide.

As reported in Macromolecules, 1995, vol. 28, pages 2993 ff., alkoxyamine compounds such as illustrated below may be used in lieu of the combined use of a radical capping agent and a radical generator.

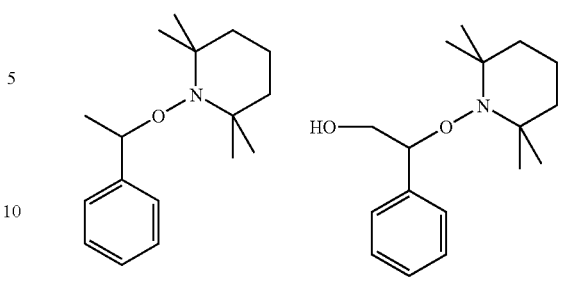

When an alkoxyamine compound is used as the initiator and when said compound is a hydroxy- or like functional group-containing one such as illustrated above, functional group-terminated polymers are obtained.

The polymerization conditions, e.g. monomer, solvent, polymerization temperature, etc., to be used in carrying out the polymerization using the above nitroxide compound or like radical capping agent are not restricted but may be the same as those to be used in the atom transfer radical polymerization described in the following.

The atom transfer radical polymerization technique, which is preferred as the living radical polymerization method to be used in the practice of the present invention, is described in the following.

In this atom transfer radical polymerization, an organic halide, in particular an organic halide having a highly reactive carbon-halogen bond (e.g. an ester compound having a halogen at α-position or a compound having a halogen at the benzyl site), or a halogenated sulfonyl compound is used as the initiator.

A metal complex containing an element of the group 7, 8, 9, 10 or 11 of the periodic table as a central metal atom is used as the catalyst. Preferred metal species are copper, nickel, ruthenium and iron, in particular monovalent copper, divalent ruthenium and divalent iron are preferred among others. In particular, copper is preferred. Specific examples are cuprous chloride, cuprous bromide, cuprous iodide, cuprous cyanide, cuprous oxide, cuprous acetate, cuprous perchlorate and the like. When a copper compound is used, a ligand, such as 2,2'-bipyridyl or a derivative thereof, 1,10-phenanthroline or a derivative thereof, an alkylamine such as tributylamine or a polyamine such as tetramethylethylenediamine, pentamethyldiethylenetriamine or hexamethyltriethylenetetraamine, is added to enhance the catalytic activity. A tristriphenylphosphine complex of divalent ruthenium ($RuCl_2(PPh_3)_3$) is also suited for use as the catalyst. When this catalyst is used, an aluminum compound such as a trialkoxyaluminum is added for increasing the activity of said catalyst. Furthermore, a tristriphenylphosphine complex of divalent iron ($FeCl_2(PPh_3)_3$) is also suited as the catalyst.

In this polymerization technique, an organic halide or a halogenated sulfonyl compound is used as the initiator. Specific examples are, among others:

$C_6H_5$—$CH_2X$, $C_6H_5$—$C(H)(X)CH_3$, $C_6H_5$—$C(X)(CH_3)_2$ (in the above chemical formulas, $C_6H_5$ is a phenyl group and X is chlorine, bromine or iodine);

$R^{11}$—$C(H)(X)$—$CO_2R^{12}$, $R^{11}$—$C(CH_3)(X)$—$COR^{12}$, $R^{11}$—C(H)(X)—C(O)$R^{12}$, $R^{11}$—C(CH$_3$)(X)—C(O)$R^{12}$ (in which $R^{11}$ and $R^{12}$ each is a hydrogen atom or an alkyl group having 1 to 20 carbon atoms, aryl group or aralkyl group and X is chlorine, bromine or iodine); and $R^{11}$—C$_6$H$_4$—SO$_2$X (in which $R^{11}$ is a hydrogen atom or an alkyl group having 1 to 20 carbon atoms, aryl group or aralkyl group and X is chlorine, bromine or iodine).

When an organic halide or halogenated sulfonyl compound having a functional group other than the functional group for initiating polymerization is used, polymers having the functional group introduced into a terminus can easily be obtained. As such functional group, there may be mentioned alkenyl, hydroxy, epoxy, amino, amide and silyl groups, among others.

The alkenyl-containing organic halide is not particularly restricted but may be one having the structure shown by the general formula 7:

$$R^{14}R^{15}C(X)-R^{16}-R^{17}-C(R^{13})=CH_2 \quad (7)$$

wherein $R^{13}$ is a hydrogen atom or a methyl group, $R^{14}$ and $R^{15}$ each is a hydrogen atom or a monovalent alkyl group having 1 to 20 carbon atoms, aryl or aralkyl group and $R^{14}$ and $R^{15}$ may be bound to each other at respective other termini, $R^{16}$ is C(O)O— (ester group), —C(O)— (keto group) or an o-, m- or p-phenylene group, $R^{17}$ is a direct bond or a divalent organic group having 1 to 20 carbon atoms, which may optionally contain one or more ether bonds, and X is chlorine, bromine or iodine.

In these compounds, the carbon atom to which the halogen is bound is bound to a carbonyl or phenyl group, for instance, so that the carbon-halogen bond is activated to initiate the polymerization.

As specific examples of the substituents $R^{14}$ and $R^{15}$, there may be mentioned hydrogen, methyl, ethyl, n-propyl, isopropyl, n-butyl, pentyl, hexyl, etc. $R^{14}$ and $R^{15}$ may be bound to each other at respective other termini to form a cyclic skeleton. In that case, —$R^{14}$—$R^{15}$— represents —CH$_2$CH$_2$—, —CH$_2$CH$_2$CH$_2$—, —CH$_2$CH$_2$CH$_2$CH$_2$— or —CH$_2$CH$_2$CH$_2$CH$_2$CH$_2$—, for instance.

As specific examples of the alkenyl-containing organic halide represented by the general formula 7, there may be mentioned the following:

XCH$_2$C(O)O(CH$_2$)$_n$CH=CH$_2$, H$_3$CC(H)(X)C(O)O(CH$_2$)$_n$CH=CH$_2$, (H$_3$C)$_2$C(X)C(O)O(CH$_2$)$_n$CH=CH$_2$,

CH$_3$CH$_2$C(H)(X)C(O)O(CH$_2$)$_n$CH=CH$_2$,

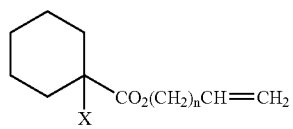

(in each formula mentioned above, X is chlorine, bromine or iodine and n is an integer of 0 to 20);

XCH$_2$C(O)O(CH$_2$)$_n$O(CH$_2$)$_m$CH=CH$_2$,

H$_3$CC(H)(X)C(O)O(CH$_2$)$_n$O(CH$_2$)$_n$CH=CH$_2$, (H$_3$C)$_2$C(X)C(O)O(CH$_2$)$_n$O(CH$_2$)$_m$CH=CH$_2$,

CH$_3$CH$_2$C(H)(X)C(O)O(CH$_2$)$_n$O(CH$_2$)$_m$CH=CH$_2$,

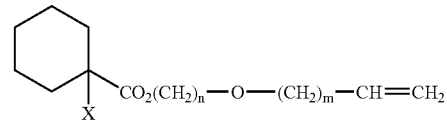

(in each formula mentioned above, X is chlorine, bromine or iodine, n is an integer of 1 to 20 and m is an integer of 0 to 20);

o,m,p-XCH$_2$—C$_6$H$_4$—(CH$_2$)$_n$—CH=CH$_2$, o,m,p-CH$_3$C(H)(X)—C$_6$H$_4$—(CH$_2$)$_n$—CH=CH$_2$, o,m,p-CH$_3$CH$_2$C(H)(X)—C$_6$H$_4$—(CH$_2$)$_n$—CH=CH$_2$, (in each formula mentioned above, X is chlorine, bromine or iodine and n is an integer of 0 to 20);

o,m,p-XCH$_2$—C$_6$H$_4$—(CH$_2$)$_n$—O—(CH$_2$)$_m$—CH=CH$_2$, o,m,p-CH$_3$C(H)(X)—C$_6$H$_4$—(CH$_2$)$_n$—(CH$_2$)$_m$—CH=CH$_2$, o,m,p-CH$_3$CH$_2$C(H)(X)—C$_6$H$_4$—(CH$_2$)$_n$—O—(CH$_2$)$_m$—CH=CH$_2$, (in each formula mentioned above, X is chlorine, bromine or iodine, n is an integer of 1 to 20 and m is an integer of 0 to 20);

o,m,p-XCH$_2$—C$_6$H$_4$—O—(CH$_2$)$_n$—CH=CH$_2$, o,m,p-CH$_3$C(H)(X)—C$_6$H$_4$—O—(CH$_2$)$_n$—CH=CH$_2$, o,m,p-CH$_3$CH$_2$C(H)(X)—C$_6$H$_4$—O—(CH$_2$)$_n$—CH=CH$_2$, (in each formula mentioned above, X is chlorine, bromine or iodine and n is an integer of 0 to 20);

o,m,p-XCH$_2$—C$_6$H$_4$—O—(CH$_2$)$_n$—O—(CH$_2$)$_m$—CH=CH$_2$, o,m,p-CH$_3$C(H)(X)—C$_6$H$_4$—O—(CH$_2$)$_n$—O—(CH$_2$)$_m$—CH=CH$_2$, o,m,p-CH$_3$CH$_2$C(H)(X)—C$_6$H$_4$—O—(CH$_2$)$_n$—O—(CH$_2$)$_m$—CH=CH$_2$, (in each formula mentioned above, X is chlorine, bromine or iodine, n is an integer of 1 to 20 and m is an integer of 0 to 20);

As the alkenyl-containing organic halide, there may further be mentioned compounds represented by the general formula 8:

$$H_2C=C(R^{13})-R^{17}-C(R^{14})(X)-R^{18}-R^{15} \quad (8)$$

wherein $R^{13}$, $R^{14}$, $R^{15}$, $R^{17}$ and X are defined above and $R^{18}$ is a direct bond, —C(O)O— (ester group), —C(O)— (keto group) or an o-, m- or p-phenylene group.

$R^{17}$ is a direct bond or a divalent organic group having 1 to 20 carbon atoms (which may optionally contain one or more ether bonds) and, when it is a direct bond, the vinyl group is bound to the carbon to which the halogen is bound, to form an allyl halide. In this case, the carbon-halogen bond is activated by the neighboring vinyl group, so that it is not always necessary for $R^{18}$ to be a C(O)O group or a phenylene group, for instance but it may be a direct bond. When $R^{17}$ is not a direct bond, $R^{18}$ is preferably a C(O)O group, C(O) group or phenylene group so that the carbon-halogen bond may be activated.

Specific examples of the compound of the general formula 8 are, among others, the following:

$CH_2=CHCH_2X$, $CH_2=C(CH_3)CH_2X$, $CH_2=CHC(H)(X)CH_3$, $CH_2=C(CH_3)C(H)(X)CH_3$, $CH_2=CHC(X)(CH_3)_2$, $CH_2=CHC(H)(X)C_2H_5$, $CH_2=CHC(H)(X)CH(CH_3)_2$, $CH_2=CHC(H)(X)C_6H_5$, $-CH_2=CHC(H)(X)CH_2C_6H_5$, $CH_2=CHCH_2C(H)(X)-CO_2R$, $CH_2=CH(CH_2)_2C(H)(X)-CO_2R$, $CH_2=CH(CH_2)_3C(H)(X)-CO_2R$, $CH_2=CH(CH_2)_8C(H)(X)-CO_2R$, $CH_2=CHCH_2C(H)(X)-C_6H_5$, $CH_2=CH(CH_2)_2C(H)(X)-C_6H_5$, $CH_2=CH(CH_2)_3C(H)(X)-C_6H_5$ (in each formula mentioned above, X is chlorine, bromine or iodine and R is an alkyl group having 1 to 20 carbon atoms, aryl group or aralkyl group).

Specific examples of the alkenyl-containing halogenated sulfonyl compound are as follows:

o,m,p-$CH_2=CH-(CH_2)_n-C_6H_4-SO_2X$ and o,m,p-$CH_2=CH-(CH_2)_n-O-C_6H_4-SO_2X$ (in each formula mentioned above, X is chlorine, bromine or iodine and n is an integer of 0 to 20), and the like.

In the case of an alkenyl-containing initiator, the olefin of said initiator may possibly react with the polymerization termini, so that care should be exercised in selecting the polymerization conditions and the conditions for the reaction with the olefin compound to be added. As a specific example, there may be mentioned the addition of the olefin compound at an early stage of polymerization.

The crosslinkable silyl-containing organic halide is not particularly restricted but includes, among others, those having a structure shown by the general formula 9:

$$R^{14}R^{15}C(X)-R^{16}-R^{17}-C(H)(R^{13})CH_2-[Si(R^9)_{2-b}(Y)_bO]_m-Si(R^{10})_{3-a}(Y)_a \quad (9)$$

wherein $R^9$, $R^{10}$, $R^{13}$, $R^{14}$, $R^{15}$, $R^{16}$, $R^{17}$, a, b, m, X and Y are as defined above.

Specific examples of the compound of the general formula 9 are as follows:

$XCH_2C(O)O(CH_2)_nSi(OCH_3)_3$, $CH_3C(H)(X)C(O)O(CH_2)_nSi(OCH_3)_3$, $(CH_3)_2C(X)C(O)O(CH_2)_nSi(OCH_3)_3$, $XCH_2C(O)O(CH_2)_nSi(CH_3)(OCH_3)_2$, $CH_3C(H)(X)C(O)O(CH_2)_nSi(CH_3)(OCH_3)_2$, $(CH_3)_2C(X)C(O)O(CH_2)_nSi(CH_3)(OCH_3)_2$ (in each formula mentioned above, X is chlorine, bromine or iodine and n is an integer of 0 to 20);

$XCH_2C(O)O(CH_2)_nO(CH_2)_mSi(OCH_3)_3$, $H_3CC(H)(X)C(O)O(CH_2)_nO(CH_2)_mSi(OCH_3)_3$, $(H_3C)_2C(X)C(O)O(CH_2)_nO(CH_2)_mSi(OCH_3)_3$, $CH_3CH_2C(H)(X)C(O)O(CH_2)_nO(CH_2)_mSi(OCH_3)_3$, $XCH_2C(O)O(CH_2)_nO(CH_2)_mSi(CH_3)(OCH_3)_2$, $H_3CC(H)(X)C(O)O(CH_2)_nO(CH_2)_m-Si(CH_3)(OCH_3)_2$, $(H_3C)_2C(X)C(O)O(CH_2)_nO(CH_2)_m-Si(CH_3)(OCH_3)_2$, $CH_3CH_2C(H)(X)C(O)O(CH_2)_nO(CH_2)_m-Si(CH_3)(OCH_3)_2$ (in each formula mentioned above, X is chlorine, bromine or iodine, n is an integer of 1 to 20 and m is an integer of 0 to 20);

o,m,p-$XCH_2-C_6H_4-(CH_2)_2Si(OCH_3)_3$, o,m,p-$CH_3C(H)(X)-C_6H_4-(CH_2)_2Si(OCH_3)_3$, o,m,p-$CH_3CH_2C(H)(X)-C_6H_4-(CH_2)_2Si(OCH_3)_3$, o,m,p-$XCH_2-C_6H_4-(CH_2)_3Si(OCH_3)_3$, o,m,p-$CH_3C(H)(X)-C_6H_4-(CH_2)_3Si(OCH_3)_3$, o,m,p-$CH_3CH_2C(H)(X)-C_6H_4-(CH_2)_3Si(OCH_3)_3$, o,m,p-$XCH_2-C_6H_4-(CH_2)_2-O-(CH_2)_3Si(OCH_3)_3$, o,m,p-$CH_3C(H)(X)-C_6H_4-(CH_2)_2-O-(CH_2)_3Si(OCH_3)_3$, o,m,p-$CH_3CH_2C(H)(X)-C_6H_4-(CH_2)_2-O-(CH_2)_3Si(OCH_3)_3$, o,m,p-$XCH_2-C_6H_4-O-(CH_2)_3Si(OCH_3)_3$, o,m,p-$CH_3C(H)(X)-C_6H_4-O-(CH_2)_3Si(OCH_3)_3$, o,m,p-$CH_3CH_2C(H)(X)-C_6H_4-O-(CH_2)_3-Si(OCH_3)_3$, o,m,p-$XCH_2-C_6H_4-O-(CH_2)_2-O-(CH_2)_3-Si(OCH_3)_3$, o,m,p-$CH_3C(H)(X)-C_6H_4-O-(CH_2)_2-O-(CH_2)_3Si(OCH_3)_3$, o,m,p-$CH_3CH_2C(H)(X)-C_6H_4-O-(CH_2)_2-O-(CH_2)_3Si(OCH_3)_3$ (in each formula mentioned above, X is chlorine, bromine or iodine), and the like.

As further examples of the crosslinkable silyl-containing organic halide, there may be mentioned those having a structure represented by the general formula 10:

$$(R^{10})_{3-a}(Y)_aSi-[OSi(R^9)_{2-b}(Y)_b]_m-CH_2-C(H)(R^{13})-R^{17}-C(R^{14})(X)-R^{18}-R^{15} \quad (10)$$

wherein $R^9$, $R^{10}$, $R^{13}$, $R^{14}$, $R^{15}$, $R^{17}$, $R^{18}$, a, b, m, X and Y are as defined above.

Specific examples of such compound are as follows:

$(CH_3O)_3SiCH_2CH_2C(H)(X)C_6H_5$, $(CH_3O)_2(CH_3)SiCH_2CH_2C(H)(X)C_6H_5$, $(CH_3O)_3Si(CH_2)_2C(H)(X)-CO_2R$, $(CH_3O)_2(CH_3)Si(CH_2)_2C(H)(X)-CO_2R$, $(CH_3O)_3Si(CH_2)_3C(H)(X)-CO_2R$, $(CH_3O)_2(CH_3)Si(CH_2)_3C(H)(X)-CO_2R$, $(CH_3O)_3Si(CH_2)_4C(H)(X)-CO_2R$, $(CH_3O)_2(CH_3)Si(CH_2)_4C(H)(X)-CO_2R$, $(CH_3O)_3Si(CH_2)_9C(H)(X)-CO_2R$, $(CH_3O)_2(CH_3)Si(CH_2)_9C(H)(X)-CO_2R$, $(CH_3O)_3Si(CH_2)_3C(H)(X)-C_6H_5$, $(CH_3O)_2(CH_3)Si(CH_2)_3C(H)(X)-C_6H_5$, $(CH_3O)_3Si(CH_2)_4C(H)(X)-C_6H_5$, $(CH_3O)_2(CH_3)Si(CH_2)_4C(H)(X)-C_6H_5$ (in each formula mentioned above, X is chlorine, bromine or iodine and R is an alkyl group having 1 to 20 carbon atoms, aryl group or aralkyl group) and the like.

The hydroxy-containing organic halide or halogenated sulfonyl compound is not particularly restricted but includes, among others, compounds mentioned below:
HO—(CH$_2$)$_n$—OC(O)C(H)(R)(X)

wherein X is chlorine, bromine or iodine, R is a hydrogen atom, an alkyl having 1 to 20 carbon atoms, an aryl group or an aralkyl group and n is an integer of 1 to 20.

The amino-containing organic halide or halogenated sulfonyl compound is not particularly restricted but includes, among others, compounds mentioned below:
H$_2$N—(CH$_2$)$_n$—OC(O)C(H)(R)(X)

wherein X is chlorine, bromine or iodine, R is a hydrogen atom, an alkyl having 1 to 20 carbon atoms, an aryl group or an aralkyl group and n is an integer of 1 to 20.

The epoxy-containing organic halide or halogenated sulfonyl compound is not particularly restricted but includes, among others, compounds mentioned below:

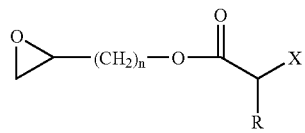

wherein X is chlorine, bromine or iodine, R is a hydrogen atom, an alkyl having 1 to 20 carbon atoms, an aryl group or an aralkyl group and n is an integer of 1 to 20.

For obtaining polymers having two or more terminal structures represented by the general formula 1 within each molecule, an organic halide or halogenated sulfonyl compound having two or more initiation sites is used as the initiator. Specific examples are:

o, m, p- X—CH$_2$—C$_6$H$_4$—CH$_2$—X  (i-1)

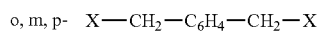 (i-2)

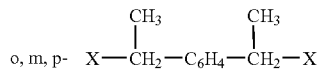 (i-3)

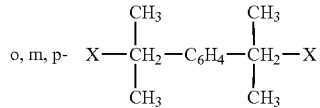 (i-4)

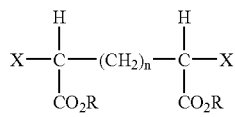 (i-5)

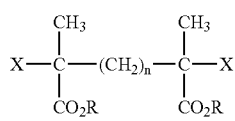 (i-6)

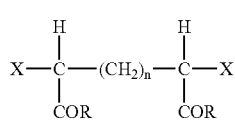 (i-7)

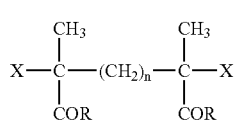

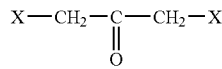 (i-8)

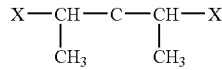 (i-9)

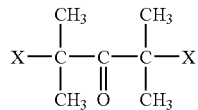 (I-10)

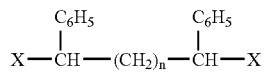 (i-11)

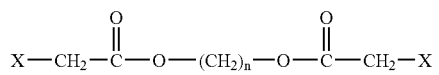 (i-12)

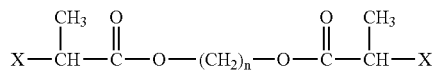 (i-13)

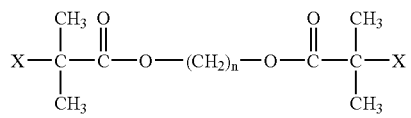 (i-14)

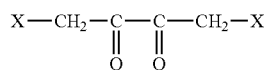 (i-15)

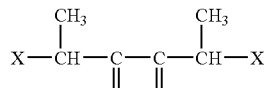 (i-16)

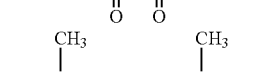

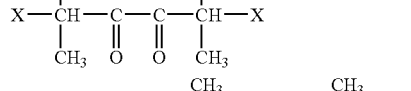

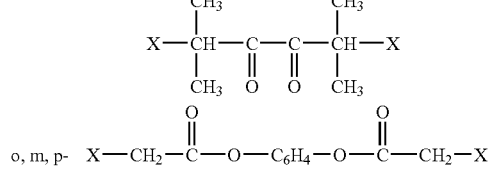

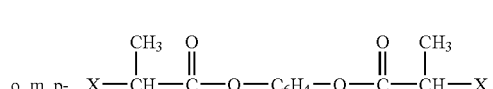

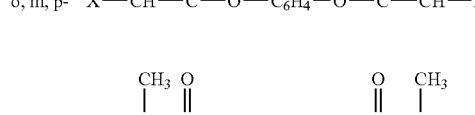

o, m, p- X—SO$_2$—C$_6$H$_4$—SO$_2$—X (in which C$_6$H$_4$ represents a phenylene group, X is chlorine, bromine or iodine, R is an alkyl group containing 1 to 20 carbon atoms, an aryl group or an aralkyl group, and n is an integer of 0 to 20) and the like.

The radical polymerizable olefin monomer to be used in this polymerization is not particularly restricted but includes those various species already mentioned hereinabove. Since the polymerization system shown herein is a living polymerization system, it is also possible to produce block copolymers by successive addition of polymerizable monomers.

The polymerization can be carried out in the absence or presence of various solvents. The solvent species are not particularly restricted, however as an example thereof, there may be mentioned, hydrocarbon solvents such as benzene and toluene; ether solvents such as diethyl ether and tetrahydrofuran; halogenated hydrocarbon solvents such as methylene chloride and chloroform; ketone solvents such as acetone, methyl ethyl ketone and methyl isobutyl ketone; alcohol solvents such as methanol, ethanol, propanol, isopropanol, n-butyl alcohol and tert-butyl alcohol; nitrile solvents such as acetonitrile, propionitrile and benzonitrile; ester solvents such as ethyl acetate and butyl acetate; and carbonate solvents such as ethylene carbonate and propylene carbonate. These may be used singly or two or more of them may be used in admixture.

The polymerization can be conducted within the temperature range of room temperature to 200° C., preferably 50° C. to 150° C.

Upon addition of the functional group-containing olefin compound having low polymerizability, during such living radical polymerization or at the end point thereof, approximately one molecule adds to each terminus and, as a result, the functional group of said olefin compound is introduced terminally into the polymer. The end point of polymerization is the time point at which preferably not less than 80%, more preferably not less than 90%, particularly not less than 95%, most preferably not less than 99%, of the monomers have reacted.

The functional group-containing olefin compound having low polymerizability is selected from among compounds represented by the general formula 4:

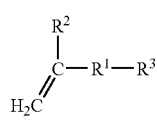

(4)

wherein $R^3$ is a hydroxy, amino, epoxy, carboxylic acid, ester, ether, amide or silyl group, a group represented by the general formula 2:

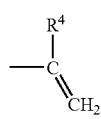

(2)

wherein $R^4$ represents a hydrogen atom or a methyl group, or a polymerizable olefin-free organic group containing 1 to 20 carbon atoms, $R^1$ is a divalent hydrocarbon group containing 1 to 20 carbon atoms or a group having a structure of the general formula 3:

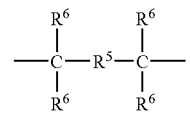

(3)

(in which $R^5$ is an oxygen atom or nitrogen atom or an organic group containing 1 to 20 carbon atoms, $R^6$ is a hydrogen atom or a methyl group and each may be the same or different) and $R^2$ is a hydrogen atom or a methyl group.

As specific examples of $R^1$ in the general formula 4, there may be mentioned:

—$(CH_2)_n$— (n being an integer of 1 to 20),
—$CH(CH_3)$—, —$CH(CH_2CH_3)$—, —$C(CH_3)_2$—, —$C(CH_3)(CH_2CH_3)$—, —$C(CH_2CH_3)_2$—, —$CH_2CH(CH_3)$—, —$(CH_2)_n$—O—$CH_2$— (n being an integer of 1 to 19),
—$CH(CH_3)$—O—$CH_2$—, —$CH(CH_2CH_3)$—O—$CH_2$—, —$C(CH_3)_2$—O—$CH_2$—, —$C(CH_3)(CH_2CH_3)$—O—$CH_2$—, —$C(CH_2CH_3)_2$—O—$CH_2$—, —$(CH_2)_n$—O—$(CH_2)_m$— (m and n each being an integer of 1 to 19, with the condition $2 \leq m+n \leq 20$),
—$(CH_2)_n$—C(O)O—$(CH_2)_m$— (m and n each being an integer of 1 to 19, with the condition $2 \leq m+n \leq 20$),
—$(CH_2)_n$—OC(O)—$(CH_2)_m$—C(O)O—$(CH_2)_l$— (l being an integer of 0 to 18 and m and n each being an integer of 1 to 17, with the condition $2 \leq l+m+n \leq 18$),
—$(CH_2)_n$-o-,m-,p-$C_6H_4$—, —$(CH_2)_n$-o-,m-,p-$C_6H_4$—$(CH_2)_m$—, (m being an integer of 0 to 13 and n being an integer of 1 to 14, with the condition $1 \leq m+n \leq 14$),
—$(CH_2)_n$-o-,m-,p-$C_6H_4$—O—$(CH_2)_m$— (m being an integer of 0 to 13 and n being an integer of 1 to 14, with the condition $1 \leq m+n \leq 14$),
—$(CH_2)_n$-o-,m-,p-$C_6H_4$—O—$CH(CH_3)$— (n being an integer of 1 to 12),
—$(CH_2)_n$-o-,m-,p-$C_6H_4$—O—$CH(CH_3)_2$— (n being an integer of 1 to 11),
—$(CH_2)_n$-o-,m-,p-$C_6H_4$—C(O)O—$(CH_2)_m$— (m and n each being an integer of 1 to 12, with the condition $2 \leq m+n \leq 13$),
—$(CH_2)_n$—OC(O)-o-,m-,p-$C_6H_4$—C(O)O—$(CH_2)_m$— (m and n each being an integer of 1 to 11, with the condition $2 \leq m+n \leq 12$),
—$(CH_2)_n$-o-,m-,p-$C_6H_4$—OC(O)—$(CH_2)_m$— (m and n each being an integer of 1 to 12, with the condition $2 \leq m+n \leq 13$),
—$(CH_2)_n$—C(O)O-o-,m-,p-$C_6H_4$—$(CH_2)_m$— (m and n each being an integer of 1 to 11, with the condition $2 \leq m+n \leq 12$), etc.

$R^2$ in the general formula 4 is a hydrogen atom or a methyl group, preferably a hydrogen atom.

As examples of $R^3$ in the general formula 4, there may be mentioned, among others, the following groups:

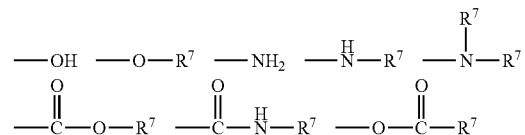

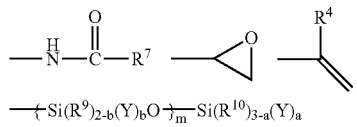

wherein $R^7$ is a hydrocarbon group containing 1 to 20 carbon atoms; $R^9$ and $R^{10}$ each is an alkyl group containing 1 to 20 carbon atoms, an aryl group containing 6 to 20 carbon atoms, an aralkyl group containing 7 to 20 carbon atoms or a triorganosiloxy group represented by $(R')_3SiO—$ (R' being a monovalent hydrocarbon group containing 1 to 20 carbon atoms and the three R' groups may be the same or different) and, when two or more $R^9$ or $R^{10}$ groups are present, they may be the same or different; Y represents a hydroxy group or a hydrolyzable group and, when two or more Y groups are present, they may be the same or different; a represents 0, 1, 2 or 3, b represents 0, 1 or 2 and m is an integer of 0 to 19, with the condition that the relation $a+mb \geq 1$ should be satisfied.

As $R^7$, the following groups may specifically be mentioned, among others:

—$(CH_2)_n$—$CH_3$,

—$CH(CH_3)$—$(CH_2)_n$—$CH_3$,

—$CH(CH_2CH_3)$—$(CH_2)_n$—$CH_3$,

—$CH(CH_2CH_3)_2$,

—$C(CH_3)_2$—$(CH_2)_n$—$CH_3$,

—$C(CH_3)(CH_2CH_3)$—$(CH_2)_n$—$CH_3$,

—$C_6H_5$,

—$C_6H_5(CH_3)$,

—$C_6H_5(CH_3)_2$,

—$(CH_2)_n$—$C_6H_5$,

—$(CH_2)_n$—$C_6H_5$ $(CH_3)$,

—$(CH_2)_n$—$C_6H_5(CH_3)_2$ (n being an integer not smaller than 0 and the total number of carbon atoms in each group being not more than 20).

The hydrolyzable group represented by Y is not particularly restricted but may be any of those known in the art. Specifically, there may be mentioned a hydrogen, halogen atom, and alkoxy, acyloxy, ketoximate, amino, amide, acid amide, aminoxy, mercapto, alkenyloxy and like groups. From the viewpoint of mild hydrolyzability and easy handling, alkoxy groups are particularly preferred. One to three such hydrolyzable and/or hydroxy groups can be bound to one silicon atom and the total number of hydrolyzable groups, namely a+mb, is preferably within the range of 1 to 5. When two or more hydrolyzable and/or hydroxy groups are present in this silyl group, they may be the same or different. The number of silicon atoms constituting this silicon group may be one, two or more and, in the case of silicon atoms connected by siloxane bonding, the number of silicon atoms may amount up to about 20.

Among them, the compound having two alkenyl groups having low polymerizability, which is to be used for alkenyl group introduction, is selected from among compounds represented by the general formula 5:

wherein $R^1$ is as defined above; and $R^2$ and $R^4$ each is a hydrogen atom or a methyl group and they may be the same or different.

The compound of the general formula 5 is not particularly restricted but includes, as preferred examples in the case of $R^1$ being a divalent hydrocarbon group containing 1 to 20 carbon atoms, compounds mentioned below:

$$\underset{H_2C}{\overset{H}{\underset{\|}{C}}}{-\!(CH_2)_n\!-}\underset{CH_2}{\overset{H}{\underset{\|}{C}}} \qquad (6)$$

n is an integer of 1 to 20. From the viewpoint of ready raw material availability, however, it is preferred that n be 2, 4 or 6. Thus, 1,5-hexadiene, 1,7-octadiene and 1,9-decadiene are preferred.

As for other functional group-containing olefin compounds having low polymerizability, alkenyl alcohols and alkenylamines are preferred.

The silyl group, which the olefin compound having low polymerizability has, is not particularly restricted, but it is preferred that the compound is represented by the formula given hereinabove in which m is equal to 0 (m=0).

In cases where amino-, hydroxy- or carboxylic acid group-containing olefin compounds having low polymerizability are to be reacted with polymerization termini, they may be subjected to reaction as they are but may possibly affect polymerization termini or the catalyst in some instances. In such case, they may be used as compounds having a protective group. As the protective group, there may be mentioned acetyl, silyl and alkoxy groups, among others.

The amount of the olefin compounds having low polymerizability to be added for introducing such functional groups is not particularly restricted. The reactivity of the alkenyl group in these compounds is not very high and it is therefore preferred that the addition amount be increased to increase the rate of reaction. On the other hand, for cost reduction, it is preferred that the addition amount be nearly equivalent to growing termini. Rationalization is therefore required depending on the conditions.

In the case of introducing alkenyl groups into termini, the addition amount of the compound having two or more alkenyl groups having low polymerizability is preferably such that said compound be in excess relative to growing polymerization termini. When the amount of said compound is equivalent or smaller as compared with polymerization termini, there may arise the possibility that both of the two alkenyl groups react with and couple together polymerization termini. In the case of a compound having two alkenyl groups equal in reactivity, the probability of coupling occurring is determined in a statistical manner by the amount added in excess. A preferred addition amount is therefore not less than 1.5 times, more preferably not less than 3 times, most preferably not less than 5 times.

In applying the polymer produced according to the present invention, the functional group introduced is utilized as it is or further subjected to conversion reaction and utilized in the form of another functional group. More specifically, an alkenyl group can be converted to a crosslinkable silyl group by the hydrosilylation reaction with a crosslinkable silyl-containing hydrosilane compound. As the alkenyl-terminated vinyl polymer, those obtained by the processes already mentioned hereinabove can all judiciously be used.

The crosslinkable silyl-containing hydrosilane compound is not particularly restricted but includes, as typical examples, compounds represented by the general formula 11:

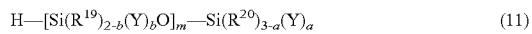

wherein $R^{19}$ and $R^{20}$ each represents an alkyl group containing 1 to 20 carbon atoms, an aryl group containing 6 to 20 carbon atoms, an aralkyl group containing 7 to 20 carbon atoms or a triorganosiloxy group represented by $(R')_3SiO$— (in which R' is a monovalent hydrocarbon group containing 1 to 20 carbon atoms and the three R' groups may be the same or different) and, when two or more $R^{19}$ or $R^{20}$ groups are present, they may be the same or different; Y represents a hydroxy group or a hydrolyzable group and when two or more Y groups are present, they may be the same or different; a represents 0, 1, 2 or 3, b represents 0, 1 or 2 and m is an integer of 0 to 19, with the condition that the relation $a+mb \geq 1$ should be satisfied.

The hydrolyzable group represented by Y is not particularly restricted but may be any of those known in the art. Specifically, there may be mentioned a hydrogen or halogen, alkoxy, and acyloxy, ketoximate, amino, amide, acid amide, aminoxy, mercapto, alkenyloxy and like groups. From the viewpoint of mild hydrolyzability and easy handling, alkoxy groups are particularly preferred. One to three such hydrolyzable and/or hydroxy groups can be bound to one silicon atom and the total number of hydrolyzable groups, namely a+mb, is preferably within the range of 1 to 5. When two or more hydrolyzable and/or hydroxy groups are present in this silyl group, they may be the same or different. The number of silicon atoms constituting this silicon group may be one, two or more and, in the case of silicon atoms connected by siloxane bonding, the number of silicon atoms may amount up to about 20.

As specific examples of $R^{19}$ and $R^{20}$ in the general formula 11, there may be mentioned, among others, alkyl groups such as methyl and ethyl; cycloalkyl groups such as cyclohexyl; aryl groups such as phenyl; aralkyl groups such as benzyl; and triorganosilyl groups represented by $(R')_3SiO$— in which R' is methyl, phenyl or the like.

Among such hydrosilane compounds, those hydrosilane compounds represented by the general formula 12:

wherein $R^{20}$, Y and a are defined above, are preferred because of their ready availability.

As specific examples of the crosslinkable silyl-containing hydrosilane compound represented by the general formula 11 or 12, there may be mentioned, among others, the following:

$HSiCl_3$, $HSi(CH_3)Cl_2$, $HSi(CH_3)_2Cl$, $HSi(OCH_3)_3$, $HSi(CH_3)(OCH_3)_2$, $HSi(CH_3)_2OCH_3$, $HSi(OC_2H_5)_3$, $HSi(CH_3)(OC_2H_5)_2$, $HSi(CH_3)_2OC_2H_5$, $HSi(OC_3H_7)_3$, $HSi(C_2H_5)(OCH_3)_2$, $HSi(C_2H_5)_2OCH_3$, $HSi(C_6H_5)(OCH_3)_2$, $HSi(C_6H_5)_2(OCH_3)$, $HSi(CH_3)(OC(O)CH_3)_2$, $HSi(CH_3)_2O$—$[Si(CH_3)_2O]_2$—$Si(CH_3)(OCH_3)_2$, $HSi(CH_3)[O$—$N$═$C(CH_3)_2]_2$ (In the above chemical formulas, $C_6H_5$ denotes a phenyl group.)

In causing such a crosslinkable silyl-containing hydrosilane compound to add to an alkenyl-terminated vinyl polymer, a hydrosilylation catalyst is used. As such hydrosilylation catalyst, there can be mentioned radical initiators such as organic peroxides and azo compounds, and transition metal catalysts.

As the radical initiator, various ones can be used without any particular restriction. As examples, there may be mentioned dialkyl peroxides such as di-t-butyl peroxide, 2,5-dimethyl-2,5-di(t-butylperoxy)hexane, 2,5-dimethyl-2,5-di (t-butylperoxy)-3-hexyne, dicumyl peroxide, t-butyl cumyl peroxide and α,α'-bis(t-butylperoxy)isopropylbenzene; diacyl peroxides such as benzoyl peroxide, p-chlorobenzoyl peroxide, m-chlorobenzoyl peroxide, 2,4-dichlorobenzoyl peroxide and lauroyl peroxide; peracid esters such as t-butyl perbenzoate; peroxydicarbonates such as diisopropyl peroxydicarbonate and di-2-ethylhexyl peroxydicarboante; and peroxyketals such as 1,1-di(t-butylperoxy)cyclohexane and 1,1-di(t-butylperoxy)-3,3,5-trimethylcyclohexane.

As the transition metal catalyst, there may be mentioned, among others, elementary platinum; solid platinum dispersed and supported on a carrier such as alumina, silica or carbon black; chloroplatinic acid; complexes of chloroplatinic acid with alcohols, aldehydes, ketones or the like; platinum-olefin complexes and the platinum(0)-divinyltetramethyldisiloxane complex. As examples of the catalyst other than platinum compounds, there may be mentioned, among others, $RhCl(PPh_3)_3$, $RhCl_3$, $RuCl_3$, $IrCl_3$, $FeCl_3$, $AlCl_3$, $PdCl_2 \cdot H_2O$, $NiCl_2$ and $TiCl_4$. These catalysts may be used singly or two or more of them may be used combinedly.

As regards the catalyst amount, there are no particular restrictions. It is recommended, however, that the catalyst be used in an amount within the range of $10^{-1}$ to $10^{-8}$ mole, preferably $10^{-3}$ to $10^{-6}$ mole, per mole of the alkenyl group in the vinyl polymer. When the amount is smaller than $10^{-8}$ mole, the curing will not proceed to a satisfactory extent. Since the hydrosilylation catalyst is expensive, it is preferred that it be not used in excess of $10^{-1}$ mole.

In cases where allyl alcohol or methallyl alcohol is used as the functional group-containing olefin compound having low polymerizability for reaction with polymerization termini, a terminus is formed on the carbon atoms on which an active group, such as a halogen atom, and a hydroxy group are in vicinal positions. This terminus can be converted to an epoxy group by cyclization. The process for carrying out this cyclization is not particularly restricted but it is preferred that an alkaline compound is used for the reaction. The alkaline compound is not particularly restricted, but there can be mentioned, among others, KOH, NaOH, $Ca(OH)_2$, ammonia and various amines.

Furthermore, the hydroxy group at a polymer terminus can be converted to an allyl group by condensation reaction with an allyl halide compound such as allyl chloride or allyl bromide. It can also be converted to an epoxy group by a similar reaction using epichlorohydrin.

The hydroxy or amino group at a polymer terminus can be converted to a crosslinkable silyl group by reacting with a compound having a crosslinkable silyl group and a functional group capable of reacting with the hydroxy or amino group. As the functional group capable of reacting with the hydroxy or amino group, there may be mentioned, among others, halogens, carboxylic acid halide, carboxylic acid, isocyanate and like. The isocyanato group is preferred, however, from the viewpoint of ready availability of appropriate compounds and of mild reaction conditions in carrying out the reaction with the hydroxy group, hence scarce decomposition of crosslinkable silyl groups.

Such crosslinkable silyl-containing isocyanate compound is not particularly restricted but may be any of those known in the art. Specific examples are, among others, the following:

$(CH_3O)_3Si-(CH_2)_n-NCO$, $(CH_3O)_2(CH_3)Si-(CH_2)_n-NCO$, $(C_2H_5O)_3Si-(CH_2)_n-NCO$, $(C_2H_5O)_2(CH_3)Si-(CH_2)_n-NCO$, $(i-C_3H_7O)_3Si-(CH_2)_n-NCO$, $(i-C_3H_7O)_2(CH_3)Si-(CH_2)_n-NCO$, $(CH_3O)_3Si-(CH_2)_n-NH-(CH_2)_m-NCO$, $(CH_3O)_2(CH_3)Si-(CH_2)_n-NH-(CH_2)_m-NCO$, $(C_2H_5O)_3Si-(CH_2)_n-NH-(CH_2)_m-NCO$, $(C_2H_5O)_2(CH_3)Si-(CH_2)_n-NH-(CH_2)_m-NCO$, $(i-C_3H_7O)_3Si-(CH_2)_n-NH-(CH_2)_m-NCO$, $(i-C_3H_7O)_2(CH_3)Si-(CH_2)_n-NH-(CH_2)_n-NCO$ (In each formula mentioned above, n and m each is an integer of 1 to 20.)

The reaction between the hydroxy-terminated vinyl polymer and the crosslinkable silyl-containing isocyanate compound can be carried out in the absence or presence of any of various solvents at a reaction temperature of 0° C. to 100° C., preferably 20° C. to 50° C. On that occasion, a tin catalyst and/or a tertiary amine catalyst, which is to be mentioned later herein, can be used for promoting the reaction between the hydroxy group and isocyanato group.

Curable Composition

These functional group-terminated polymers can be used in curable compositions in which various curing reactions are utilized.

The alkenyl-terminated vinyl polymer of the present invention can be used in curable compositions comprising (A) the alkenyl-terminated vinyl polymer and (B) a compound having at least two hydrosilyl groups.

The (A) component alkenyl-terminated vinyl polymer may comprise a single species or a mixture of two or more species. The molecular weight of the (A) component is not particularly restricted but is preferably within the range of 500 to 100,000, more preferably 3,000 to 40,000. When it is lower than 500, the characteristics intrinsic in the vinyl polymer can hardly be expressed. When it exceeds 100,000, a very high viscosity or low solubility results, hence handling becomes difficult.

The (B) component compound having at least two hydrosilyl groups is not particularly restricted but may be any of various ones. Thus, use may be made, for example, of linear polysiloxanes represented by the general formula 13 or 14:

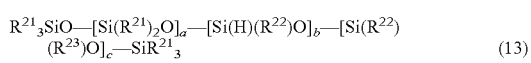  (13)

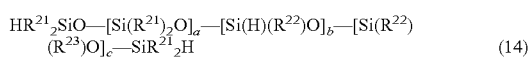  (14)

wherein $R^{21}$ and $R^{22}$ each represents an alkyl group containing 1 to 6 carbon atoms or a phenyl group, $R^{23}$ represents an alkyl group containing 1 to 10 carbon atoms or an aralkyl group containing 7 to 10 carbon atoms and a is an integer within the range of $0 \leq a \leq 100$, b is an integer within the range of $2 \leq b \leq 100$ and c is an integer within the range of $0 \leq c \leq 100$; cyclic siloxanes represented by the general formula 15:

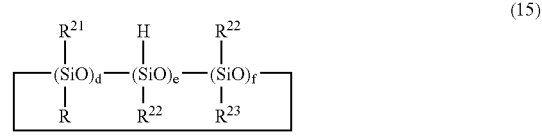  (15)

wherein $R^{21}$ and $R^{22}$ each represents an alkyl group containing 1 to 6 carbon atoms or a phenyl group, $R^{23}$ represents an alkyl group containing 1 to 10 carbon atoms or an aralkyl group containing 7 to 10 carbon atoms and d is an integer within the range of $0 \leq d \leq 8$, e is an integer within the range of $2 \leq e \leq 10$ and f is an integer within the range of $0 \leq f \leq 8$, with the condition $3 \leq d+e+f \leq 10$.

These may be used singly or two or more of them may be used in admixture. Preferred among these siloxanes from the viewpoint of compatibility with the vinyl polymer are phenyl-containing linear siloxanes of the general formula 16 or 17 and cyclic siloxanes of the general formula 18 or 19:

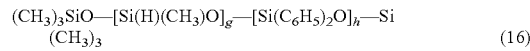  (16)

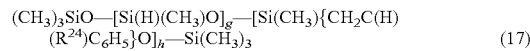  (17)

wherein $R^{24}$ is a hydrogen atom or a methyl group, g is an integer within the range of $2 \leq g \leq 100$ and h is an integer within the range of $0 \leq h \leq 100$, and $C_6H$, denotes a phenyl group;

  (18)

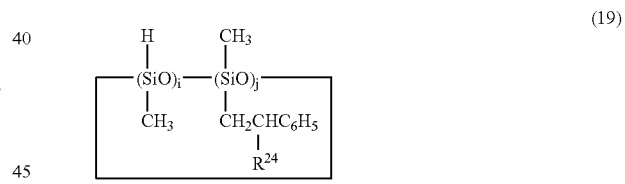  (19)

wherein $R^{24}$ is a hydrogen atom or a methyl group, i is an integer within the range of $2 \leq i \leq 10$ and j is an integer within the range of $0 \leq j \leq 8$, with the condition $3 \leq i+j \leq 10$, and $C_6H_5$ denotes a phenyl group.

Also useful as the (B) component compound having at least two hydrosilyl groups are those compounds obtained by addition reaction of a hydrosilyl-containing compound represented by one of the formulas 13 to 19 to a low-molecular compound having two or more alkenyl groups within each molecule in a manner such that the hydrosilyl group partly remains even after the reaction. Various compounds can be used as the compound having two or more alkenyl groups within each molecule. As examples, there may be mentioned hydrocarbon compounds such as 1,4-pentadiene, 1,5-hexadiene, 1,6-heptadiene, 1,7-octadiene, 1,8-nonadiene and 1,9-decadiene; ether compounds such as O,O'-diallylbisphenol A and 3,3'-diallylbisphenol A; ester compounds such as diallyl phthalate, diallyl isophthalate, triallyl trimellitate and tetraallyl pyromellitate; and carbonate compounds such as diethylene glycol diallyl carbonate.

Said compounds can be obtained by slowly adding the above-mentioned alkenyl-containing compound dropwise to an excess of the hydrosilyl-containing compound represented by one of the formulas 13 to 19 in the presence of a hydrosilylation catalyst. Among such compounds, those illustrated below are preferred considering the ready availability of raw material, ease of removing the siloxane used in excess and further the compatibility with the (A) component polymer:

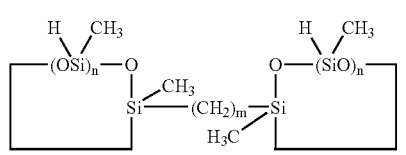
(ii-1)

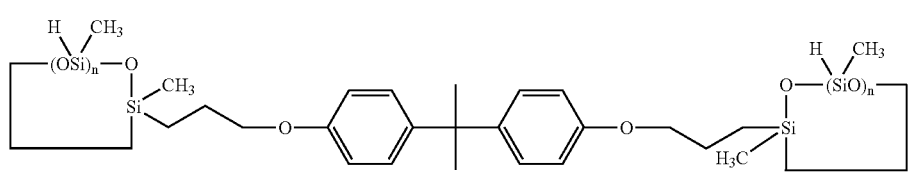
(ii-2)

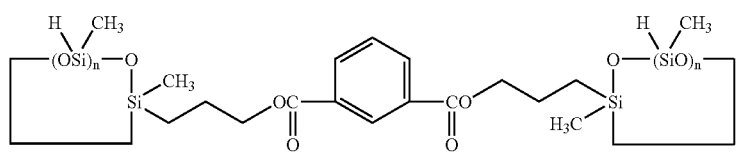
(ii-3)

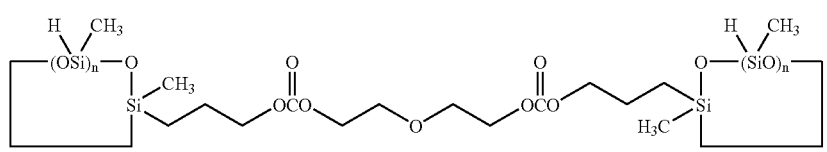
(ii-4)

In the above formulas, n is an integer of 2 to 4 and m is an integer of 5 to 10.

The polymer (A) can be mixed with the curing agent (B) in an arbitrary ratio. From the curability viewpoint, however, the mole ratio between the alkenyl group and hydrosilyl group is preferably within the range of 5 to 0.2, most preferably 2.5 to 0.4. When said mole ratio is not less than 5, insufficient curing will result and only cured products having low strength and stickiness will be obtained. When it is less than 0.2, a large amount of the active hydrosilyl group remains in cured products even after curing, so that cracks and voids will appear and thus uniform cured products having strength will not be obtained.

The curing reaction between the polymer (A) and curing agent (B) proceeds upon mixing of the two components and heating. For accelerating the reaction, however, a hydrosilylation catalyst is added. As such hydrosilylation catalyst, all of those already mentioned hereinabove can be used.

The crosslinkable silyl-terminated vinyl polymer of the present invention can be used in curing compositions comprising said polymer as a main component.

When coming into contact with moisture, the crosslinkable silyl-terminated vinyl polymer cures by being rendered three-dimensioned as a result of a crosslinking reaction. Since the rate of hydrolysis varies depending on the humidity, temperature and hydrolyzable group species, an appropriate hydrolyzable group should be selected according to the use conditions.

For promoting the curing reaction, a condensation catalyst may be added. As the condensation catalyst, there may be used titanate esters such as tetrabutyl titanate and tetrapropyl titanate; organotin compounds such as dibutyltin dilaurate, dibutyltin maleate, dibutyltin diacetate, stannous octoate and stannous naphthenate; lead octylate, amine compounds such as butylamine, octylamine, dibutylamine, monoethanolamine, diethanolamine, triethanolamine, diethylenetriamine, triethylenetetramine, oleylamine, octylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine and 1,3-diazabicylco(5.4.6)undecene-7, and carboxylic acid salts thereof; low-molecular polyamide resins obtained from an excess of a polyamine and a polybasic acid; reaction products obtained from an excess of a polyamine and an epoxy compound; and amino-containing silane coupling agents such as γ-aminopropyltrimethoxysilane and N-(β-aminoethyl)aminopropylmethyldimethoxysilane. Such known silanol catalysts may be used singly or two or more of them may be used according to need. The addition amount is preferably 0 to 10% by weight relative to the crosslinkable silyl-terminated vinyl polymer. In cases where an alkoxy group is used as the hydrolyzable group Y, the use of a condensation catalyst is preferred since said polymer alone shows a slow rate of curing.

The crosslinkable silyl-terminated vinyl polymer, which is the main component, when allowed to cure with a condensation catalyst added if necessary, can give uniform cured products. The curing conditions are not particularly restricted but generally as follows: a temperature of 0 to 100° C., preferably 10 to 50° C. and a reaction period of 1 hour to about 1 week. A variety of cured products, from rubber-like to resin-like ones, can be produced, although the properties thereof depend on the main chain skeleton and molecular weight, among others.

The hydroxy-terminated vinyl polymer of the present invention can be used in curable compositions comprising the same as the main component.

These compositions comprise, as essential components, (A) the hydroxy- or amino-terminated vinyl polymer and (B) a compound having at least two functional groups capable of reacting with the hydroxy or amino group.

The (A) component hydroxy- or amino-terminated vinyl polymer may be used singly, or a mixture of two or more thereof can be used. The molecular weight thereof is not particularly restricted but is preferably within the range of 500 too 100,000. When it is smaller than 500, the characteristics intrinsic in the vinyl polymer can hardly be expressed. When it exceeds 100,000, a very high viscosity or low solubility will result and handling will become difficult.

The (B) component compound having at least two functional groups capable of reacting with the hydroxy or amino group is not particularly restricted but includes, among others, polyisocyanate compounds having two or more isocyanate groups per molecule; aminoplast resins such as hydroxymethylated melamine and alkyl ethers thereof or low condensates thereof; polybasic carboxylic acids and halides thereof.

As the polyvalent isocyanate compound having two or more isocyanato groups per molecule, those so far known in the art such as can be used, and for example, there can be mentioned isocyanate compounds such as 2,4-tolylene diisocyanate, 2,6-tolylene diisocyanate, 4,4'-diphenylmethanediisocyanate, hexamethylene diisocyanate, xylylene diisocyanate, metaxylylene diisocyanate, 1,5-naphthalenediisocyanate, hydrogenated diphenylmethanediisocyanate, hydrogenated tolylene diisocyanate, hydrogenated xylylene diisocyanate, isophoronediisocyanate and a triisocyanate such as Ipposha Yushi's B-45; biuret polyisocyanate compounds such as Sumidur N (product of Sumitomo Bayer Urethane); isocyanurate ring-containing polyisocyanate compounds such as Desmodur IL and HL (products of Bayer A.G.) and Coronate EH (product of Nippon Polyurethane); adduct polyisocyanate compounds such as Sumidur L (product of Sumitomo Bayer Urethane); and adduct polyisocyanate compounds such as Coronate HL (product of Nippon Polyurethane). Blocked isocyanates may also be used. These may be used singly or two or more of them may be used combinedly.

The mixing ratio between the hydroxy- or amino-terminated polymer and the compound having at least two isocyanato groups is not particularly restricted but, for example, the ratio (NCO/OH mole ratio) of the isocyanato group to the hydroxy group of the hydroxy-terminated vinyl polymer is preferably 0.5 to 3.0, more preferably 0.8 to 2.0.

For promoting the curing reaction between the hydroxy-terminated vinyl polymer and the compound having two or more isocyanato groups, a known catalyst, such as a organotin compound or a tertiary amine, may be added according to need.

As specific examples of the organotin compound, there may be mentioned, among others, stannous octoate, dibutyltin diacetate, dibutyltin dilaurate, dibutyltin mercaptides, dibutyltin thiocarboxylates, dibutyltin dimaleate, dioctyltin thiocarboxylates and the like. As the tertiary amine catalyst, there may be mentioned triethylamine, N,N-dimethylcyclohexylamine, N,N,N',N'-tetramethylethylenediamine, N,N,N',N'-tetramethylpropane-1,3-diamine, N,N,N',N'-tetramethylhexane-1,6-diamine, N,N,N',N'',N''-pentamethyldiethylenetriamine, N,N,N',N'',N''-pentamethyldipropylenetriamine, tetramethylguanidine, triethylenediamine, N,N'-dimethylpiperazine, N-methylmorpholine, 1,2-dimethylimidazole, dimethylaminoethanol, dimethylaminoethoxyethanol, N,N,N'-trimethylaminoethylethanolamine, N-methyl-N'-(2-hydroxyethyl)piperazine, N-(2-hydroxyethyl)-morpholine, bis(2-dimethylaminoethyl) ether, ethylene glycol bis(3-dimethylaminopropyl)ether and the like.

As the aminoplast resin to be used in the curable composition of the present invention, it is not particularly restricted but there can be mentioned melamine-formaldehyde addition products (methylol compounds), melamine-formaldehyde low condensates, alkyl ethers thereof, and urea resins, among others. These may be used singly or two or more may be used combinedly. For promoting the curing reaction between the hydroxy-terminated (meth)acrylic polymer and the aminoplast resin, a known catalyst, such as paratoluenesulfonic acid or benzenesulfonic acid, may be added.

As the polybasic carboxylic acid having at least two carboxyl groups within each molecule, which is to be used in the curable composition of the present invention, it is not particularly restricted but there can be mentioned, among others, oxalic acid, malonic acid, succinic acid, glutaric acid, adipic acid, phthalic acid, phthalic anhydride, terephthalic acid, trimellitic acid, pyromellitic acid, maleic acid, maleic anhydride, fumaric acid, itaconic acid, like polybasic carboxylic acids and anhydrides thereof, and halides thereof. These may be used singly or two or more of them may be used combinedly.

When the two components (A) and (B) of the curable composition of the present invention are mixed up, if necessary together with a curing catalyst, and allowed to cure, uniform cured products excellent in depth curability can be obtained. The curing conditions are not particularly restricted but, generally, a temperature of 0° C. to 100° C., preferably 20° C. to 80° C., is employed.

The properties of the cured products depend on the main chain skeletons and molecular weights of the (A) component polymer and (B) component curing agent employed and may range widely from rubber-like ones to resin-like ones.

The epoxy-terminated vinyl polymer of the present invention can be used in curable compositions comprising (A) the epoxy-terminated vinyl polymer and (B) a curing agent.

As (B) curing agent, various agents can be used, for example aliphatic amines, aromatic amines, acid anhydrides, and urea, melamine and phenol resins.

Applications of the cured products obtained from the curable compositions of the present invention, such as mentioned above, are specifically as follows: sealing materials, adhesives, pressure sensitive adhesives, elastic adhesives, paints, powder coating compositions, foamed products, potting agents for use in electric and electronic fields, films, molding materials, artificial marble and so forth.

BEST MODES FOR CARRYING OUT THE INVENTION

The following specific examples illustrate this invention. They are, however, by no means limitative of the scope of this invention.

EXAMPLE 1

A 30-mL glass reaction vessel was charged with butyl acrylate (10.0 mL, 8.94 g, 69.75 mmol), cuprous bromide (250 mg, 1.74 mmol), pentamethyldiethylenetriamine (0.364 mL, 302 mg, 1.74 mmol) and toluene (1 mL) and, after cooling and deaeration under vacuum, the vessel was purged with nitrogen gas. After thorough stirring of the mixture, methyl 2-bromopropionate (0.195 mL, 291 mg, 1.74 mmol) was added, and the whole mixture was stirred at 70° C. Thirty minutes later, 1,9-decadiene (1.61 mL, 1.21 g, 8.72 mmol) was added and stirring at 70° C. was continued for 9 hours. The reaction mixture was treated with activated alumina and the excessive portion of 1,9-decadiene (b.p. 169° C.) was distilled off with heating under reduced pressure. The thus-obtained polymer had a number average molecular weight of 5,300 as determined by GPC (as expressed in terms of polystyrene equivalent) with a molecular weight distribution of 1.41. The olefinic functional group introduction rate based on the initiator was 0.95.

EXAMPLE 2

A 30-mL glass reaction vessel was charged with butyl acrylate (10.0 mL, 8.94 g, 69.75 mmol), cuprous bromide (250 mg, 1.74 mmol), pentamethyldiethylenetriamine (0.364 mL, 302 mg, 1.74 mmol) and toluene (1 mL) and, after cooling and deaeration under vacuum, the vessel was purged with nitrogen gas. After thorough stirring of the mixture, methyl 2-bromopropionate (0.195 mL, 291 mg, 1.74 mmol) was added, and the whole mixture was stirred at 70° C. Forty-five minutes later, 1,5-hexadiene (1.01 mL, 0.70 g, 8.72 mmol) was added and stirring at 70° C. was continued for 8 hours. The reaction mixture was treated with activated alumina and the excessive portion of 1,5-hexadiene was distilled off with heating under reduced pressure. The thus-obtained polymer had a number average molecular weight of 4,800 as determined by GPC (as expressed in terms of polystyrene equivalent) with a molecular weight distribution of 1.33. The olefinic functional group introduction rate based on the initiator was 0.71.

EXAMPLE 3

A 100-mL glass reaction vessel was charged with butyl acrylate (50.0 mL, 44.7 g, 0.349 mol), cuprous bromide (1.25 g, 8.72 mmol), pentamethyldiethylenetriamine (1.82 mL, 1.51 g, 8.72 mmol) and acetonitrile (5 mL) and, after cooling and deaeration under vacuum, the vessel was purged with nitrogen gas. After thorough stirring of the mixture, diethyl 2,5-dibromoadipate (1.57 g, 4.36 mmol) was added, and the whole mixture was stirred at 70° C. Sixty minutes later, 1,7-octadiene (6.44 mL, 4.80 g, 43.6 mmol) was added and stirring at 70° C. was continued for 2 hours. The reaction mixture was treated with activated alumina and the volatile matter was distilled off with heating under reduced pressure. The product was dissolved in ethyl acetate and the solution was washed with 2% hydrochloric acid and brine. The organic layer was dried over $Na_2SO_4$ and the volatile matter was distilled off with heating under reduced pressure, to give an alkenyl-terminated polymer. The polymer obtained had a number average molecular weight of 13,100 as determined by GPC (as expressed in terms of polystyrene equivalent) with a molecular weight distribution of 1.22. The olefinic functional group introduction rate based on the number average molecular weight was 2.01.

EXAMPLE 4

The alkenyl-terminated poly(n-butyl acrylate) (30.5 g) obtained in Example 3 and an equal amount of aluminum silicate (Kyowaad 700 PEL; product of Kyowa Chemical) were mixed together in toluene and the mixture was stirred at 100° C. Four hours later, the aluminum silicate was filtered off and the volatile matter was distilled off with heating under reduced pressure to purify the polymer.

A 200-mL glass-made pressure reaction vessel was charged with the above polymer (23.3 g), dimethoxymethylhydrosilane (2.55 mL, 20.7 mmol), dimethylorthoformate (0.38 mL, 3.45 mmol) and a platinum catalyst. The platinum catalyst was used in a mole ratio of $2 \times 10^{-4}$ equivalents relative to the alkenyl group in the polymer. The reaction mixture was heated at 100° C. for 3 hours. The volatile matter was distilled off from the mixture to give a crosslinkable silyl-terminated poly(n-butyl acrylate). The number of silyl groups introduced per oligomer molecule was 1.41 as determined by $^1$H-NMR analysis.

EXAMPLE 5

The silyl-terminated poly(butyl acrylate) obtained in Example 4, dibutyltin dimethoxide and water were mixed up. The tin catalyst and water were used each in an amount of 1 weight part relative to the polymer.

The thus-obtained composition was poured into a mold, deaerated under reduced pressure and heated at 50° C. for 20 hours for curing, to give a sheet-like cured product having rubber elasticity. The cured product was immersed in toluene for 24 hours and the gel fraction was determined based on the change in weight between before and after immersion and found to be 85%.

Dumbbell test specimens (No. 2(1/3)) were punched out from the sheet-like cured product and subjected to tensile testing using a Shimadzu autograph (measurement conditions: 23° C., 200 mm/min). The strength at rupture was 0.34 MPa and the elongation at rupture was 86%.

EXAMPLE 6

In a 500-mL three-necked flask equipped with a reflux condenser, n-butyl acrylate (300 mL) was polymerized in a nitrogen atmosphere at 70° C. using cuprous bromide (1.50 g, 10.5 mmol) as the catalyst, pentamethyldiethylenetriamine (1.65 mL) as the ligand, diethyl 2,5-dibromoadipate (9.42 g, 26.2 mmol) as the initiator and acetonitrile (30 mL) as the solvent. At the time point when the percent polymerization of n-butyl acrylate amount to 93%, 1,7-octadiene (38.6 mL, 0.261 mol) was added and the resulting mixture was heated at the same temperature. The reaction product was diluted with ethyl acetate, the dilution was passed through an activated alumina column to thereby remove the catalyst, and the volatile matter was distilled off with heating under reduced pressure to give an alkenyl-terminated polymer. The polymer had a number average molecular weight of 13,800 as determined by GPC (as expressed in terms of polystyrene equivalent) with a molecular weight distribution of 1.28. The number of alkenyl groups introduced per oligomer molecule was 1.84 as determined by $^1$H-NMR analysis.

EXAMPLES 7 TO 9

Production of Cured Products

The alkenyl-terminated polymer obtained in Example 6 was treated with aluminum silicate (Kyowaad 700 PEL; product of Kyowa Chemical) to remove the trace impurities in the polymer.

Then, the purified poly(acrylic ester) was mixed up with a polyvalent hydrogensilicone compound and the complex of platinum having a valency of 0 with 1,1,3,3-tetramethyl-1,3-divinyldisiloxane (8.3×10$^{-8}$ mol/L solution in xylene; 7.0×10$^{-3}$ mole equivalent relative to the alkenyl group). The polyvalent hydrogensilicone compound used was the compound S-1 illustrated below (SiH value: 7.72 mmol/g) (Example 7), the compound S-2 illustrated below (SiH value: 9.81 mmol/g) (Example 8) or partially α-methylstyrene-modified methylhydrogensiloxane S-3 (SiH value: 7.69 mmol/g) (Example 9). The amount of the polyvalent hydrogensilicone compound used was such that the mole ratio between the alkenyl group in the polymer and the SiH group of the hydrogensilicone compound amounted to 1/1.2 to 1/1.5.

A portion of each of the thus-obtained compositions was subjected to a curing test on a hot plate maintained at 130° C. and the gelling time was measured. The remaining portion of each composition was deaerated under reduced pressure and poured into a mold and subjected to curing under heating. Heating at 100° C. gave a rubber-like cured product. The composition cured in 15 seconds in Example 7, 21 seconds in Example 8 and 26 seconds in Example 9.

molecular weight distribution of 1.22. The hydroxy group introduction rate was 1.3 as determined based on the number average molecular weight.

EXAMPLE 11

Epoxy Group Introduction by Addition of Allyl Alcohol

In a nitrogen atmosphere, a 100-mL glass reaction vessel was charged with cuprous bromide (0.500 g, 3.49 mmol), acetonitrile (5 mL), butylacrylate (50.0 mL, 44.7 g, 0.349 mol), diethyl 2,5-dibromoadipate (1.57 g, 4.36 mmol) and pentamethyldiethylenetriamine (0.0910 mL, 0.0755 g, 0.436 mmol) and the mixture was stirred at 70° C. for 180 minutes. At that time, the consumption of butyl acrylate was 94% as determined by GC analysis. Immediately, allyl alcohol (1.78 mL, 1.52 g, 0.0262 mol) was added, and stirring was further continued at 70° C. for 300 minutes. The mixture was treated with activated alumina and the volatile matter was distilled off with heating under reduced pressure. The polymer obtained had a number average molecular weight of 11,300 as determined by GPC (as expressed in terms of polystyrene

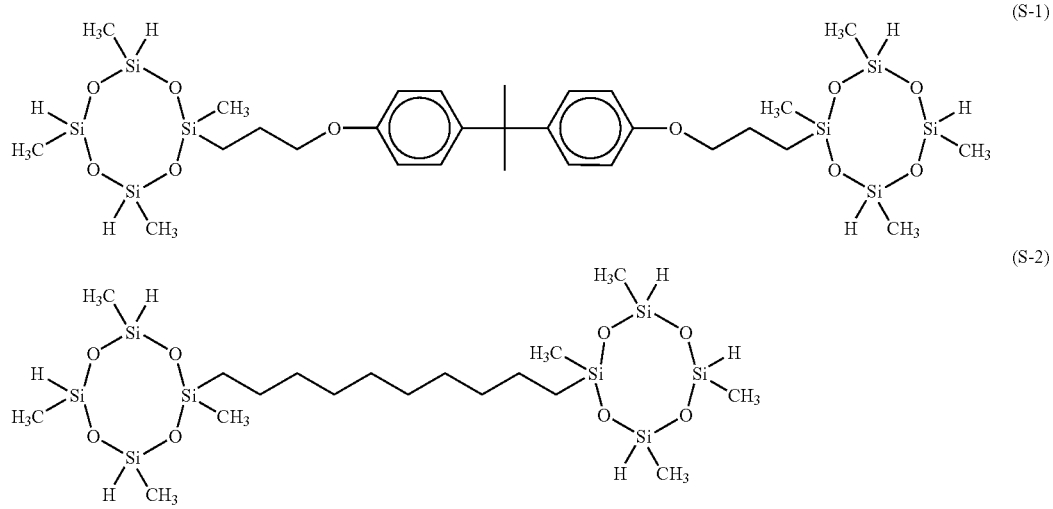

equivalent) with a molecular weight distribution of 1.2. This was heated in refluxing pyridine and then the volatile matter was distilled off with heating under reduced pressure. The epoxy group introduction was confirmed by $^1$H-NMR analysis of the oligomer obtained.

EXAMPLE 10

Hydroxy Group Introduction by Addition of Pentenol

In a nitrogen atmosphere, a 100-mL glass reaction vessel was charged with cuprous bromide (0.500 g, 3.49 mmol), acetonitrile (5 mL), butylacrylate (50.0 mL, 44.7 g, 0.349 mol), diethyl 2,5-dibromoadipate (1.57 g, 4.36 mmol) and pentamethyldiethylenetriamine (0.103 mL, 0.0855 g, 0.493 mmol) and the mixture was stirred at 70° C. for 150 minutes. At that time, the consumption of butyl acrylate was 98% as determined by GC analysis. Immediately, 4-pentenol (2.70 mL, 2.25 g, 0.0261 mol) was added, and stirring was further continued at 70° C. for 270 minutes. The mixture was treated with activated alumina and the volatile matter was distilled off with heating under reduced pressure to give a hydroxy-terminated polymer. The polymer obtained had a number average molecular weight of 12,600 as determined by GPC (as expressed in terms of polystyrene equivalent) with a

EXAMPLE 12

Silyl Group Introduction by Addition of an Octenylsilane

In a nitrogen atmosphere, a 100-mL glass reaction vessel was charged with cuprous bromide (1.00 g, 6.98 mmol), acetonitrile (5 mL), (50.0 mL, 44.7 g, 0.349 mol), diethyl 2,5-dibromoadipate (1.57 g, 4.36 mmol) and pentamethyldiethylenetriamine (0.0910 mL, 0.0755 g, 0.436 mmol) and the mixture was stirred at 70° C. for 180 minutes. At that time, the consumption of butyl acrylate was 87% as determined by GC analysis. Immediately, 8-dimethoxymethylsilyl-1-octene (9.43 g, 0.0436 mol) and pentamethyldiethylenetriamine (0.273 mL, 0.226 g, 1.31 mmol) were added, and stirring was further continued at 70° C. for 390 minutes. The mixture was treated with activated alumina and the volatile matter was distilled off with heating under reduced pressure to give a silyl-terminated polymer. The polymer obtained had a number average molecular weight of 14,700 as determined by GPC (as expressed in terms of polystyrene equivalent) with a molecular weight distribution of 1.35. $^1$H-NMR analysis revealed quantitative and stable terminal silyl group introduction.

EXAMPLE 13

Condensation Type Curing

The silyl-terminated poly(butyl acrylate) obtained in Example 12 was mixed up with dibutyltin dimethoxide and water. The tin catalyst and water were used each in an amount of 1 weight part relative to the polymer.

The thus-obtained composition was deaerated under reduced pressure and then heated at 50° C. for curing, to give a cured product having rubber elasticity. The cured product was immersed in toluene and the gel fraction was calculated to be 99% from the change in weight between before and after immersion.

INDUSTRIAL APPLICABILITY

The functional group-terminated vinyl polymer of the present invention, in which the terminal group is bound to the main chain via carbon-carbon bonding and therefore is stable and in which the terminal structure has the functional group introduced in a well controlled manner, is useful in applying it in curable compositions, among others. According to the production process of the present invention, it is possible to produce polymers having any of various functional groups at a terminus with ease by adding a compound which has olefin group having low polymerizability and various functional group to various vinyl monomer polymerization systems.

The invention claimed is:

1. An allyl-terminated polymer as produced by reacting a hydroxy-terminated polymer with an allyl halide, wherein the hydroxyl-terminated polymer has, at a molecular chain terminus, a structure represented by the general formula 1:

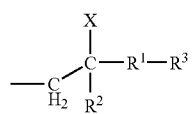

(1)

wherein $R^3$ is a hydroxyl group,
$R^1$ is a divalent hydrocarbon group containing 1 to 20 carbon atoms or a group having a structure represented by the general formula 3:

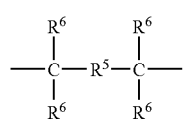

(3)

in which $R^5$ is an oxygen atom, a nitrogen atom or an organic group containing 1 to 20 carbon atoms, $R^6$ is a hydrogen atom or a methyl group and each may be the same or different, and $R^2$ is a hydrogen atom or a methyl group and X is a halogen atom, a nitroxide or sulfide group or a cobalt porphyrin complex.

2. A crosslinkable silyl-terminated polymer as produced by reacting an alkenyl-terminated polymer with a crosslinkable silyl-containing hydrosilyl compound, wherein the alkenyl-terminated polymer has, at a molecular chain terminus, a structure represented by the general formula 1:

(1)

wherein $R^3$ is a group represented by the general formula 2:

(2)

in which $R^4$ represents a hydrogen atom or a methyl group, $R^1$ is —(CH2)$_n$—, —CH(CH$_3$)—, —CH(CH$_2$CH$_3$)—, —C(CH$_3$)$_2$—, —C(CH$_3$)(CH$_2$CH$_3$)—, —C(CH$_2$CH$_3$)$_2$— or —CH$_2$CH(CH$_3$)—, wherein n is an integer of 1 to 20, and $R^2$ is a hydrogen atom or a methyl group and X is a halogen atom, a nitroxide or sulfide group or a cobalt porphyrin complex.

3. A crosslinkable silyl-terminated polymer as produced by reacting a hydroxy- or amino-terminated polymer with a compound having a crosslinkable silyl group and a functional group capable of reacting with the hydroxy or amino group, wherein the hydroxyl- or amino-terminated polymer has, at a molecular chain terminus, a structure represented by the general formula 1:

(1)

wherein $R^3$ is a hydroxyl or amino group, $R^1$ is a divalent hydrocarbon group containing 1 to 20 carbon atoms or a group having a structure represented by the general formula 3:

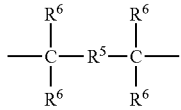
(3)

in which $R^5$ is an oxygen atom, a nitrogen atom or an organic group containing 1 to 20 carbon atoms, $R^6$ is a hydrogen atom or a methyl group and each may be the same or different, and $R^2$ is a hydrogen atom or a methyl group and X is a halogen atom, a nitroxide or sulfide group or a cobalt porphyrin complex.

4. An epoxy-terminated polymer as produced by reacting a hydroxy-terminated polymer with epichlorohydrin, wherein the hydroxyl-terminated polymer has, at a molecular chain terminus, a structure represented by the general formula 1:

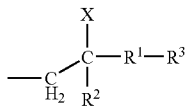
(1)

wherein $R^3$ is a hydroxyl group, $R^1$ is a divalent hydrocarbon group containing 1 to 20 carbon atoms or a group having a structure represented by the general formula 3:

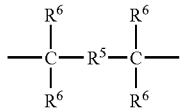
(3)

in which $R^5$ is an oxygen atom, a nitrogen atom or an organic group containing 1 to 20 carbon atoms, $R_6$ is a hydrogen atom or a methyl group and each may be the same or different, and $R^2$ is a hydrogen atom or a methyl group and X is a halogen atom, a nitroxide or sulfide group or a cobalt porphyrin complex.

5. A curable composition which comprises (A) an alkenyl-terminated polymer and (B) a compound having at least two hydrosilyl groups, wherein the alkenyl-terminated polymer has, at a molecular chain terminus, a structure represented by the general formula 1:

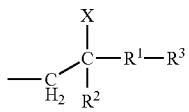
(1)

wherein $R^3$ is a group represented by the general formula 2:

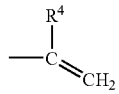
(2)

in which $R^4$ represents a hydrogen atom or a methyl group, $R^1$ is —$CH_2)_n$—, —$CH(CH_3)$—, —$CH(CH_2CH_3)$—, —$C(CH_3)_2$—, —$C(CH_3)$ $(CH_2CH_3)$—, —$C(CH_2CH_3)_2$— or —$CH_2CH(CH_3)$—, wherein n is an integer of 1 to 20, and $R^2$ is a hydrogen atom or a methyl group and X is a halogen atom, a nitroxide or sulfide group or a cobalt porphyrin complex.

6. A curable composition which comprises (A) a hydroxyl- or amino-terminated polymer and (B) a compound having at least two functional groups capable of reacting with the hydroxyl or amino group, wherein the hydroxyl- or amino-terminated polymer has, at a molecular chain terminus, a structure represented by the general formula 1:

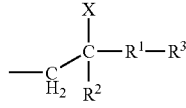
(1)

wherein $R^3$ is a hydroxyl or amino group, $R^1$ is a divalent hydrocarbon group containing 1 to 20 carbon atoms or a group having a structure represented by the general formula 3:

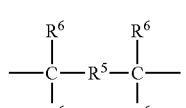
(3)

in which $R^5$ is an oxygen atom, a nitrogen atom or an organic group containing 1 to 20 carbon atoms, $R^6$ is a hydrogen atom or a methyl group and each may be the same or different, and $R^2$ is a hydrogen atom or a methyl group and X is a halogen atom, a nitroxide or sulfide group or a cobalt porphyrin complex.

7. The curable composition according to claim 6, wherein the component (B) is a polyvalent isocyanate.

8. A curable composition which comprises a crosslinkable silyl-terminated polymer produced according to claim 2 as a main component.

9. A curable composition which comprises a crosslinkable silyl-terminated polymer according to claim 3 as a main component.

10. A curable composition which comprises (A) an epoxy-terminated polymer according to claim 4 and (B) a curing agent for epoxy resins.

* * * * *